United States Patent
Peroz et al.

(10) Patent No.: US 12,306,412 B2
(45) Date of Patent: May 20, 2025

(54) WAVEGUIDES WITH INTEGRATED OPTICAL ELEMENTS AND METHODS OF MAKING THE SAME

(71) Applicant: Magic Leap, Inc., Plantation, FL (US)

(72) Inventors: Christophe Peroz, Tokyo (JP); Victor Kai Liu, Mountain View, CA (US); Samarth Bhargava, Saratoga, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/589,212

(22) Filed: Feb. 27, 2024

(65) Prior Publication Data
US 2024/0201503 A1  Jun. 20, 2024

Related U.S. Application Data

(63) Continuation of application No. 17/975,061, filed on Oct. 27, 2022, now Pat. No. 11,947,121, which is a
(Continued)

(51) Int. Cl.
*G02B 27/01* (2006.01)
*G02B 6/28* (2006.01)
(Continued)

(52) U.S. Cl.
CPC .......... *G02B 27/0172* (2013.01); *G02B 6/28* (2013.01); *G02B 27/18* (2013.01); *G06T 19/006* (2013.01); *G02B 2027/0174* (2013.01)

(58) Field of Classification Search
CPC ...... G02B 27/0172; G02B 6/28; G02B 27/18; G02B 2027/0174; G06T 19/006
See application file for complete search history.

(56) References Cited

U.S. PATENT DOCUMENTS

| 5,357,122 A | 10/1994 | Okubora et al. |
| 5,727,098 A | 3/1998 | Jacobson |

(Continued)

FOREIGN PATENT DOCUMENTS

| CN | 106842397 A | 6/2017 |
| JP | S61500941 A | 5/1986 |

(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.
(Continued)

*Primary Examiner* — Dmitriy Bolotin
(74) *Attorney, Agent, or Firm* — Tobias Intellectual Property Law, PLLC

(57) ABSTRACT

An example waveguide can include a polymer layer having substantially optically transparent material with first and second major surfaces configured such that light containing image information can propagate through the polymer layer being guided therein by reflecting from the first and second major surfaces via total internal reflection. The first surface can include first smaller and second larger surface portions monolithically integrated with the polymer layer and with each other. The first smaller surface portion can include at least a part of an in-coupling optical element configured to couple light incident on the in-coupling optical element into the polymer layer for propagation therethrough by reflection from the second major surface and the second larger surface portion of the first major surface. The waveguide can include a tilted surface portion forming at least part of an in-coupling optical element, the tilted surface portion having curvature to provide optical power.

16 Claims, 20 Drawing Sheets

Related U.S. Application Data continuation of application No. 17/044,516, filed as application No. PCT/US2019/025195 on Apr. 1, 2019, now Pat. No. 11,500,206.

(60) Provisional application No. 62/651,553, filed on Apr. 2, 2018.

(51) Int. Cl.
*G02B 27/18* (2006.01)
*G06T 19/00* (2011.01)

(56) References Cited

U.S. PATENT DOCUMENTS

| | | | |
|---|---|---|---|
| 6,075,912 A | 6/2000 | Goodman | |
| 6,473,554 B1 | 10/2002 | Pelka et al. | |
| 6,850,221 B1 | 2/2005 | Tickle | |
| 8,666,208 B1 | 3/2014 | Amirparviz | |
| 9,417,452 B2 | 8/2016 | Schowengerdt et al. | |
| 10,714,899 B2 | 7/2020 | Takazane | |
| 11,500,206 B2 | 11/2022 | Peroz et al. | |
| 2003/0085361 A1 | 5/2003 | Howells | |
| 2004/0086223 A1 | 5/2004 | Young et al. | |
| 2005/0259910 A1* | 11/2005 | Li | G02B 6/12004 385/14 |
| 2006/0028436 A1 | 2/2006 | Armstrong | |
| 2006/0140546 A1 | 6/2006 | Nakata et al. | |
| 2007/0081123 A1 | 4/2007 | Lewis | |
| 2008/0031584 A1 | 2/2008 | Payne | |
| 2008/0225507 A1 | 9/2008 | Lee et al. | |
| 2008/0226221 A1 | 9/2008 | Bidnyk et al. | |
| 2010/0148384 A1 | 6/2010 | Jenkins | |
| 2010/0220318 A1 | 9/2010 | Moll et al. | |
| 2010/0246003 A1 | 9/2010 | Simmonds et al. | |
| 2012/0099325 A1 | 4/2012 | Ghosh et al. | |
| 2012/0127062 A1 | 5/2012 | Bar-Zeev et al. | |
| 2012/0162549 A1 | 6/2012 | Gao et al. | |
| 2012/0251043 A1 | 10/2012 | Shacklette et al. | |
| 2012/0287374 A1 | 11/2012 | Mukawa | |
| 2013/0033756 A1 | 2/2013 | Spitzer et al. | |
| 2013/0082922 A1 | 4/2013 | Miller | |
| 2013/0108229 A1 | 5/2013 | Starner et al. | |
| 2013/0117377 A1 | 5/2013 | Miller | |
| 2013/0125027 A1 | 5/2013 | Abovitz | |
| 2013/0163918 A1 | 6/2013 | Won et al. | |
| 2013/0208234 A1 | 8/2013 | Lewis | |
| 2013/0222384 A1 | 8/2013 | Futterer | |
| 2013/0242262 A1 | 9/2013 | Lewis | |
| 2013/0242392 A1 | 9/2013 | Amirparviz et al. | |
| 2013/0328748 A1 | 12/2013 | Mukawa | |
| 2014/0036361 A1 | 2/2014 | Woodgate et al. | |
| 2014/0071539 A1 | 3/2014 | Gao | |
| 2014/0099121 A1 | 4/2014 | Shiraishi et al. | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2014/0321141 A1 | 10/2014 | Bauer et al. | |
| 2015/0016777 A1 | 1/2015 | Abovitz et al. | |
| 2015/0086163 A1 | 3/2015 | Valera et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0231478 A1 | 8/2016 | Kostamo | |
| 2016/0231569 A1 | 8/2016 | Levola | |
| 2016/0286204 A1 | 9/2016 | Grata et al. | |
| 2016/0327714 A1 | 11/2016 | Patrick et al. | |
| 2016/0349517 A1 | 12/2016 | Miyasaka et al. | |
| 2017/0010465 A1 | 1/2017 | Martinez et al. | |
| 2017/0010488 A1 | 1/2017 | Klug et al. | |
| 2017/0235144 A1 | 8/2017 | Piskunov et al. | |
| 2017/0307886 A1 | 10/2017 | Stenberg et al. | |
| 2017/0322420 A1 | 11/2017 | Machida et al. | |
| 2018/0017801 A1 | 1/2018 | Chang et al. | |
| 2018/0074457 A1 | 3/2018 | Jolly et al. | |
| 2018/0292676 A1 | 10/2018 | Alexander | |
| 2020/0041698 A1 | 2/2020 | Damm et al. | |
| 2020/0041794 A1 | 2/2020 | Damm | |
| 2021/0080664 A1 | 3/2021 | Pezeshki et al. | |
| 2021/0096379 A1 | 4/2021 | Peroz et al. | |

FOREIGN PATENT DOCUMENTS

| | | |
|---|---|---|
| JP | 2011164292 A | 8/2011 |
| JP | 2012009300 A | 1/2012 |
| JP | 2015087711 A | 5/2015 |
| JP | 2015102613 A | 6/2015 |
| JP | 2017032663 A | 2/2017 |
| JP | 2017032664 A | 2/2017 |
| JP | 2017173733 A | 9/2017 |
| JP | 2017531840 A | 10/2017 |
| WO | 2014109115 A1 | 7/2014 |
| WO | 2015125794 A1 | 8/2015 |
| WO | 2017102795 A1 | 6/2017 |
| WO | 2019195174 A1 | 10/2019 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

EP19782027.7 Examination Report dated Jul. 31, 2023.

International Preliminary Report for Patentability, re PCT Application No. PCT/US2019/025195, dated Oct. 6, 2020.

International Search Report and Written Opinion, re PCT Application No. PCT/US2019/025195, dated Aug. 6, 2019.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).

* cited by examiner light

WAVEGUIDES WITH INTEGRATED OPTICAL ELEMENTS AND METHODS OF MAKING THE SAME

PRIORITY CLAIM

This application is a continuation of U.S. patent application Ser. No. 17/975,061 filed on Oct. 27, 2022, which is a continuation of U.S. patent application Ser. No. 17/044,516 filed on Oct. 1, 2020, which is a national stage application under 35 U.S.C. § 371 of International Application No. PCT/US2019/025195 filed on Apr. 1, 2019, which published in English as WO 2019/195174 A1 on Oct. 10, 2019, and which claims the benefit of priority under 35 U.S.C. § 119(e) of U.S. Provisional Application No. 62/651,553 filed on Apr. 2, 2018. The entirety of each application referenced in this paragraph is expressly incorporated herein by reference.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

This disclosure provides various examples of waveguides, systems, and methods. Each example has several innovative aspects, no single one of which is solely responsible for the desirable attributes disclosed herein.

Example 1. A waveguide comprising:
a polymer layer comprising substantially optically transparent material having first and second major surfaces configured such that light containing image information can propagate through said polymer layer being guided therein by reflecting from said first and second major surfaces via total internal reflection,
wherein said first surface includes first smaller and second larger surface portions monolithically integrated with said polymer layer and with each other, said first smaller surface portion comprising at least a part of an in-coupling optical element configured to couple light incident on said in-coupling optical element into said polymer layer for propagation therethrough by reflection from said second major surface and said second larger surface portion of said first major surface.

Example 2. The waveguide of Example 1, wherein said in-coupling optical element comprises a turning mirror configured to deflect light containing image information in the waveguide.

Example 3. The waveguide of Example 2, wherein said turning mirror comprises said first smaller surface portion of said first major surface tilted with respect to said second larger surface portion of said first major surface and said second major surface.

Example 4. The waveguide of Example 2 or 3, wherein said turning mirror has optical power.

Example 5. The waveguide of Example 4, wherein said powered turning mirror comprises said first smaller surface portion of said first major surface curved with respect to said second larger surface portion of said first major surface and said second major surface.

Example 6. The waveguide of any of Examples 2 to 5, wherein said turning mirror further comprises metallization disposed on said first smaller surface portion of said first major surface.

Example 7. The waveguide of Example 1, wherein said in-coupling optical element comprises a lens.

Example 8. The waveguide of Example 7, wherein said lens comprises said first smaller surface portion of said first major surface curved with respect to said second larger surface portion of said first major surface and said second major surface.

Example 9. The waveguide of Example 1, wherein said in-coupling optical element comprises a grating.

Example 10. The waveguide of Example 9, wherein said grating comprises said first smaller surface portion of said first major surface having an undulating surface relief.

Example 11. The waveguide of any of Examples 1-10, wherein said polymer layer including said at least a part of said in-coupling optical element comprises a molded optic.

Example 12. The waveguide of any of Examples 1 to 11, wherein the plurality of surfaces has a surface roughness between about 0.1 nm to about 2.0 nm.

Example 13. A waveguide comprising
- a molded optic comprising a molded layer of substantially optically transparent material, said molded layer having first and second major surfaces configured such that light containing image information can propagate through said molded layer being guided therein by reflecting from said first and second major surfaces via total internal reflection,
- wherein said first surface includes first smaller and second larger surface portions monolithically integrated with said molded layer and with each other, said first smaller surface portion comprising at least a part of a molded in-coupling optical element configured to couple light incident on said molded in-coupling optical element into said molded layer for propagation therethrough by reflection from said second major surface and said second larger surface portion of said first major surface.

Example 14. A waveguide comprising:
- a polymer layer configured to propagate light containing image information therethrough;
- a plurality of surfaces sufficient to guide the image information in the polymer layer by total internal reflection; and
- a tilted surface portion forming at least a part of an in-coupling optical element that is configured to deflect light containing image information in the waveguide.

Example 15. The waveguide of Example 14, wherein said tilted surface portion forms an indentation in said polymer layer.

Example 16. The waveguide of Example 15, wherein said indentation in said polymer layer is at least ½ the thickness of said polymer layer.

Example 17. The waveguide of Example 15, wherein said indentation in said polymer layer is at least ¾ the thickness of said polymer layer.

Example 18. The waveguide of any of Examples 14 to 17, wherein said tilted surface portion is tilted between about 40°-50° with respect to said plurality of surfaces.

Example 19. The waveguide of any of Examples 14 to 18, wherein said in-coupling optical element comprises a turning mirror comprising metallization.

Example 20. The waveguide of any of Examples 14 to 19, wherein the tilted surface portion comprises curvature to provide optical power.

Example 21. The waveguide of any of Examples 14 to 20, wherein said polymer layer, said plurality of surfaces, and said tilted surface portion comprise a molded optic.

Example 22. The waveguide of any of Examples 14 to 21, wherein the plurality of surfaces has a surface roughness between about 0.1 nm to about 2.0 nm.

Example 23. A waveguide comprising:
- an optically transparent layer comprising optically transparent material and a plurality of surfaces sufficient to guide light containing image information in the waveguide by total internal reflection; and
- a tilted surface portion forming at least a part of an in-coupling optical element that is configured to deflect light containing image information in the waveguide such that said light is guided in said optically transparent layer, wherein the tilted surface portion comprises curvature to provide optical power.

Example 24. The waveguide of Example 23, wherein said optical power comprises positive optical power.

Example 25. The waveguide of Example 23 or 24, wherein said tilted surface portion has a concave curvature from the perspective of most locations within in the optically transparent layer.

Example 26. The waveguide of any of Examples 23 to 25, wherein the in-coupling optical element is a mirror, a facet, a prism, or a combination thereof.

Example 27. The waveguide of any of Examples 23 to 26, wherein the in-coupling optical element further comprises a metal layer on said tilted surface portion.

Example 28. The waveguide of any of Examples 23 to 27, wherein each of the plurality of surfaces has a surface roughness between about 0.1 nm to about 2.0 nm.

Example 29. The waveguide of any of Examples 23 to 28, wherein the optically transparent material comprises a polymer.

Example 30. The waveguide of any of Examples 23 to 29, wherein the optically transparent layer, plurality of surfaces, and tilted surface portion comprise a molded optic.

Example 31. A waveguide comprising:
- an optically transparent layer comprising optically transparent material and first and second surfaces sufficient to guide light containing image information in the waveguide by total internal reflection; and
- a surface portion on said first surface forming at least a part of a lens, said surface portion being curved.

Example 32. The waveguide of Example 31, wherein the lens comprises a convex lens.

Example 33. The waveguide of Example 31 or 32, wherein said lens comprises a positive powered lens.

Example 34. The waveguide of any of Examples 31 to 33, wherein the lens is aligned with an in-coupling optical element configured to turn light received by the in-coupling optical element after passing through the lens into the layer of optically transparent material to be guided therein.

Example 35. The waveguide of Example 34, wherein the in-coupling optical element is disposed on the second surface of the layer of optically transparent material.

Example 36. The waveguide of any of Examples 31 to 35, wherein each of the plurality of surfaces has a surface roughness between about 0.1 nm to about 2.0 nm.

Example 37. The waveguide of any of Examples 31 to 36, wherein the optically transparent material comprises a polymer.

Example 38. The waveguide of any of Examples 31 to 37, wherein the optically transparent layer, the first and second surfaces, and the lens comprise a molded optic.

Example 39. A waveguide comprising:
- an optically transparent layer comprising optically transparent material and first and second surfaces sufficient to guide light containing image information in the waveguide by total internal reflection; and
- a surface portion on said first surface forming at least a part of an anti-reflective structure, said anti-reflective structure comprising a surface relief pattern on said first surface.

Example 40. The waveguide of Example 39, wherein said anti-reflective structure comprises an undulating pattern.

Example 41. The waveguide of any of Examples 39 or 40, wherein said anti-reflective structure comprises a periodic pattern.

Example 42. The waveguide of Example 41, wherein the periodic pattern has a period from about 50 nm to about 200 nm.

Example 43. The waveguide of Examples 41 or 42, wherein the periodic pattern has a height from about 5 nm to about 200 nm.

Example 44. The waveguide of any of Examples 39 to 43, further comprising material disposed on said surface relief pattern.

Example 45. The waveguide of any of Examples 39 to 44, wherein the anti-reflective structure is optically aligned with an optical element associated with another waveguide.

Example 46. The waveguide of Example 45, wherein said optical element is an optical in-coupling element configured to couple light into said another waveguide.

Example 47. The waveguide of any of Examples 39 to 46, wherein each of the first and second surfaces has a surface roughness between about 0.1 nm to about 2.0 nm.

Example 48. The waveguide of any of Examples 39 to 47, wherein the optically transparent material comprises a polymer.

Example 49. The waveguide of any of Examples 39 to 48, wherein the optically transparent layer, said first and second surfaces, and said surface relief pattern comprise a molded optic.

Example 50. An optical system comprising:
one or more waveguides comprising the waveguide of any of Examples 1 to 49.

Example 51. The optical system of Example 50, wherein said one or more waveguides comprising at least two waveguides of any of Examples 1 to 49.

Example 52. The optical system of Examples 50 or 51, wherein the optical system is a head mounted display system configured to project light to an eye of a user to display augmented reality image content in a vision field of said user.

Example 53. The optical system of Example 52, further comprising:
a frame configured to be supported on a head of the user;
an image projector configured to project an image; and
an eyepiece disposed on the frame, said eyepiece configured to direct light into said user's eye to display augmented reality image content to the user's vision field, at least a portion of said eyepiece being transparent and disposed at a location in front of the user's eye when the user wears said head-mounted display system such that said transparent portion transmits light from the environment in front of the user to the user's eye to provide a view of the environment in front of the user, said eyepiece comprising said one or more waveguides.

Example 54. The optical system of Example 53, wherein the image projector comprises a scanning fiber display.

Example 55. A method of making a waveguide, the method comprising:
providing first and second molds, the first mold and the second mold facing one another, wherein at least the first mold comprises an imprint of at least a part of at least one in-coupling optical element;
providing a polymer material between the first and second molds;
contacting the polymer material with the first and second molds such that the first mold transfers a corresponding imprint of the at least a part of the at least one in-coupling optical element into the polymer material;
exposing the polymer material to a hardening process; and
removing the polymer material from the first and second molds.

Example 56. The method of Example 55, wherein exposing the polymer material to a hardening process comprises exposing the polymer material to ultraviolet light.

Example 57. The method of Example 55 or 56, wherein the waveguide comprises a plurality of surfaces sufficient to guide light containing image information in the waveguide by total internal reflection.

Example 58. The method of Example 57, wherein the plurality of surfaces has a surface roughness between about 0.1 nm to about 2.0 nm.

Example 59. The method of any of Examples 55 to 58, wherein the at least one in-coupling optical element comprises a tilted surface.

Example 60. The method of Example 59, wherein the tilted surface has curvature.

Example 61. The method of any of Examples 55 to 60, wherein the at least one in-coupling optical element comprises a lens.

Example 62. The method of any of Examples 55 to 61, wherein the at least one in-coupling optical element comprises a grating.

DETAILED DESCRIPTION

Figure 1:
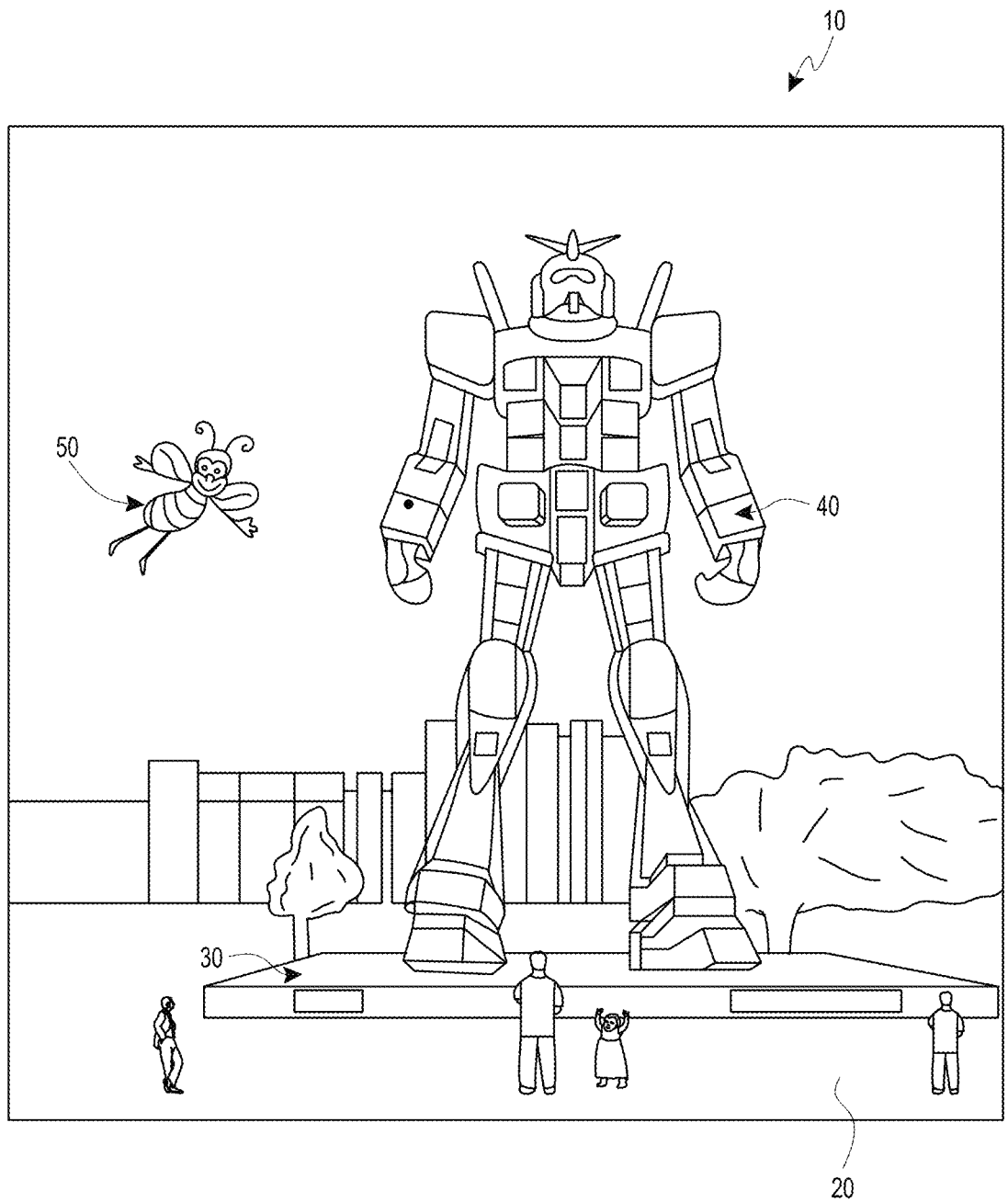
FIG. 1 illustrates a user's view of augmented reality (AR) through an AR device.

Waveguides may be utilized to direct light, such as in display devices including head-mounted augmented reality display systems. For example, the waveguides may be incorporated into an eyepiece of eyewear and the viewer may see the ambient environment through the waveguides. In addition, the waveguides may project images by receiving light containing image information (e.g., by a projector system) and directing that light into the eyes of a viewer. The received light may be in-coupled into the waveguides using in-coupling optical elements. The in-coupled light may subsequently be distributed within the waveguides using light distributing elements and out-coupled out of the waveguides using out-coupling optical elements.

Low coupling efficiency of the light between the projector system and the waveguides can lower the total efficiency of the waveguide assembly and can degrade the overall image quality provided to the viewer. Coupling between optical components can also add constraints on the manufacturing of the display device and/or system (for example, constraints on how to integrate, assemble, align, and package with other components). Accordingly, the in-coupling optical element can affect the design.

In-coupling optical elements can include conventional gratings which can have relatively low in-coupling efficiency of incoming light from a projector. Conventional gratings can also reflect light back into the projector, which can be reflected off the projector back into the grating. The stray light path can produce a ghost image artifact that can be distracting. Conventional gratings can also have inherently different diffraction efficiencies with respect to input angles. In various waveguide displays, this can make producing an image with uniform brightness difficult. Nevertheless, sometimes in-coupling gratings may be desired. Prisms and lenses may intrinsically also be advantageous optically, but can be challenging to fabricate and integrate.

Certain implementations described herein can include waveguides with an integrated in-coupling optical element. For example, various waveguides can include a surface that forms at least a part of the in-coupling optical element. Compared with waveguides without such an in-coupling optical element integrated with the waveguide, various implementations can advantageously provide higher coupling efficiency, better image quality (e.g., lower ghosting, higher uniformity, etc.), and a simpler manufacturing process. For example, in various implementations, an integrated optical element can allow direct contact with the waveguide, leading to increased in-coupling and simpler integration. Certain implementations can advantageously integrate prisms, lenses, and/or anti-reflective structures. Various implementations can reduce ghost image artifacts, achieve more uniform brightness, and reduce the total footprint of the device. Some implementations of waveguides can also integrate one or more other optical elements such as light distributing elements and/or out-coupling optical elements.

Reference will now be made to the drawings, in which like reference numerals refer to like parts throughout. Unless indicated otherwise, the drawings are schematic not necessarily drawn to scale.

Example Display Systems

Figure 2:
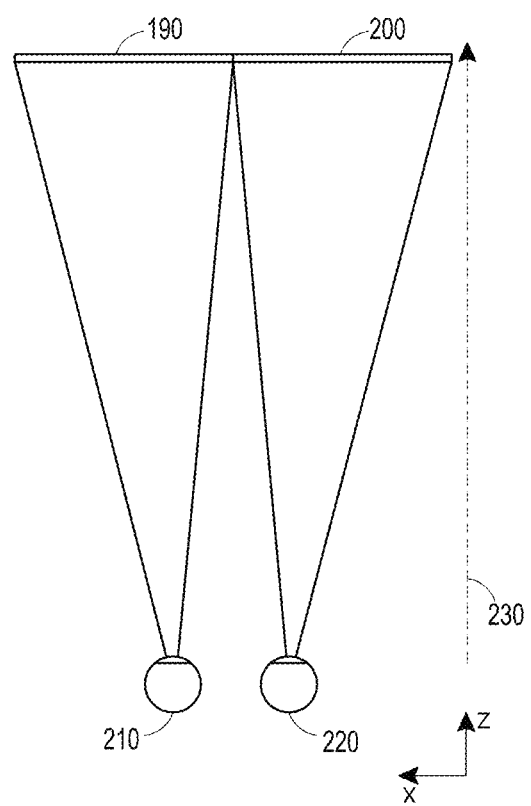
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
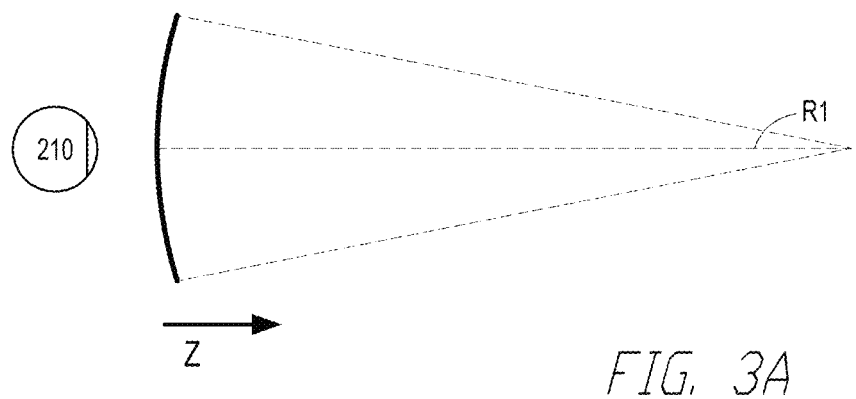
FIGS. 3A-3C illustrate relationships between radius of curvature and focal radius.
Figure 3B:
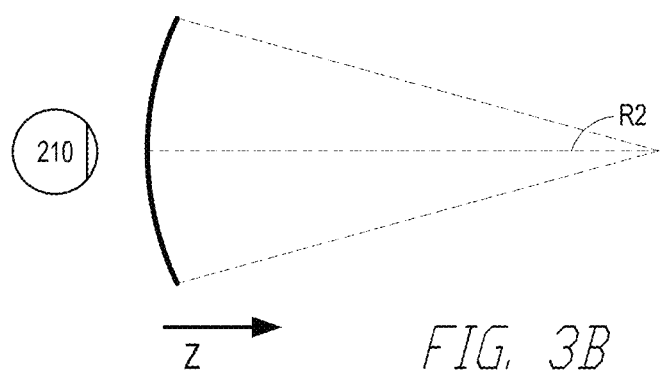
Figure 3C:
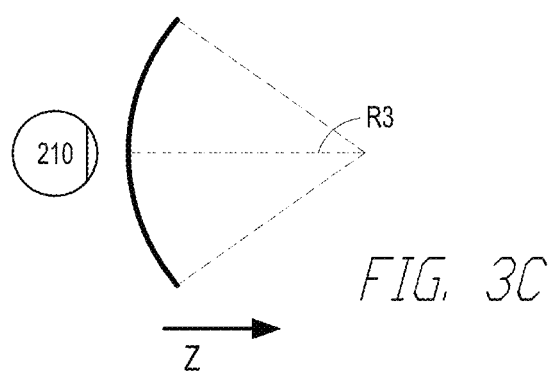

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
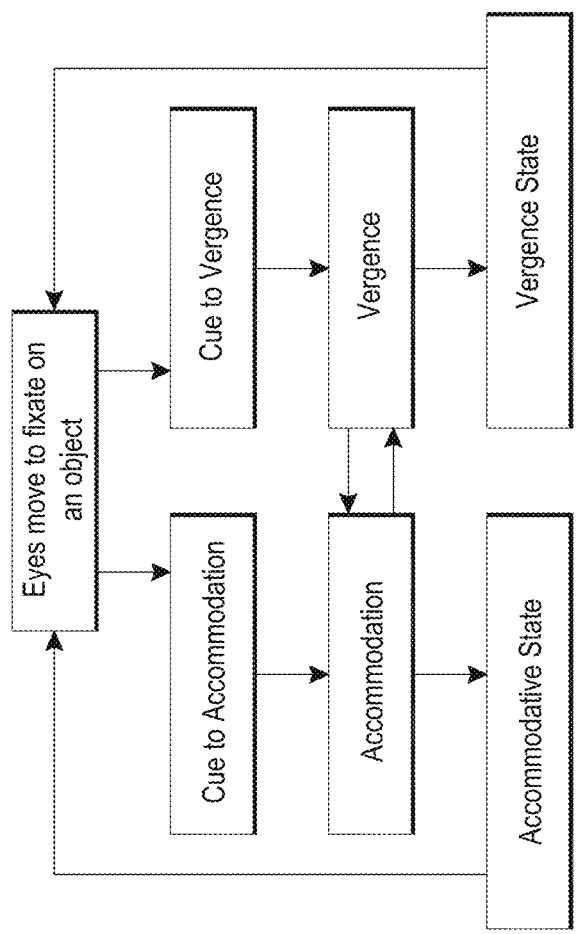
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
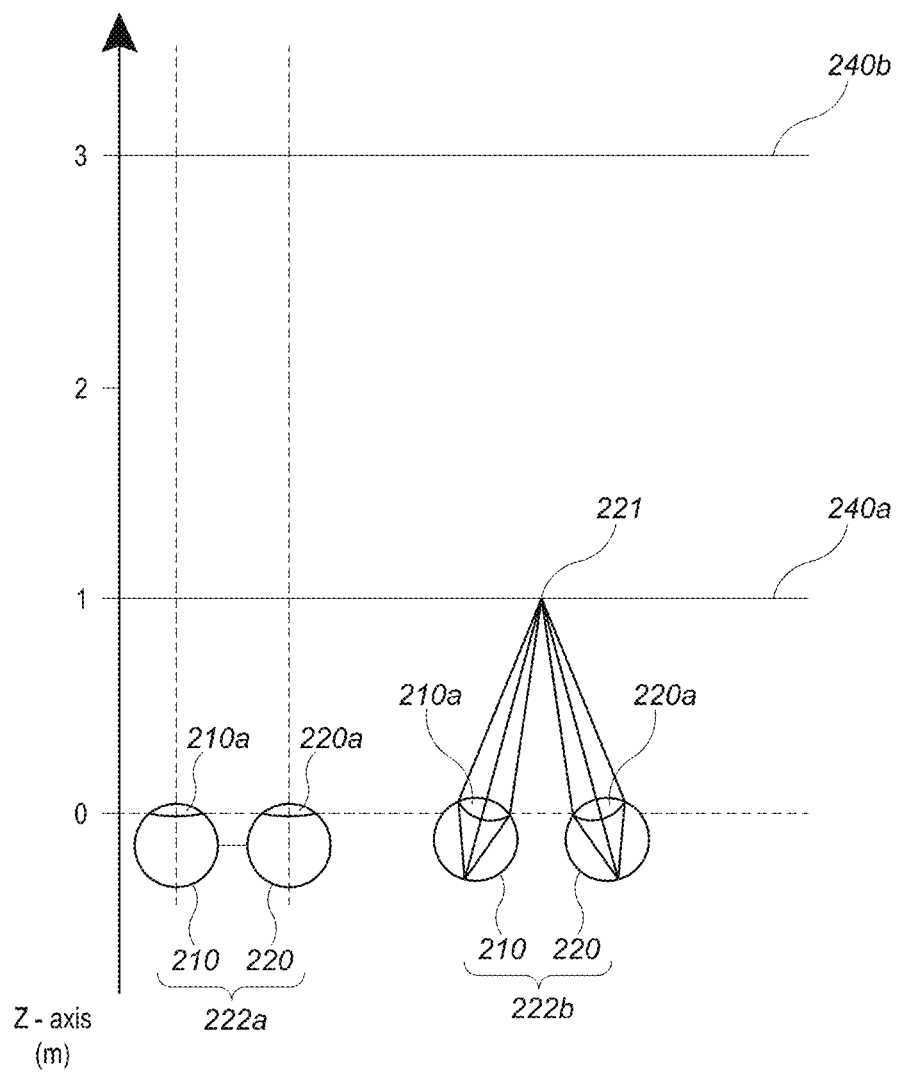
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a mis-directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
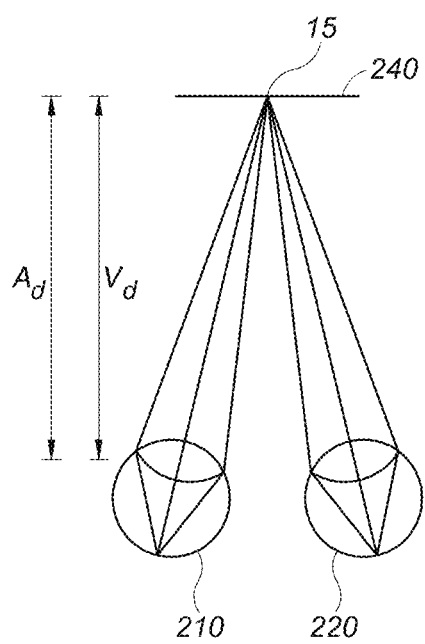
FIG. 4C illustrates an example of a representation of a top-down view of a user viewing content via a display system.
Figure 4D:
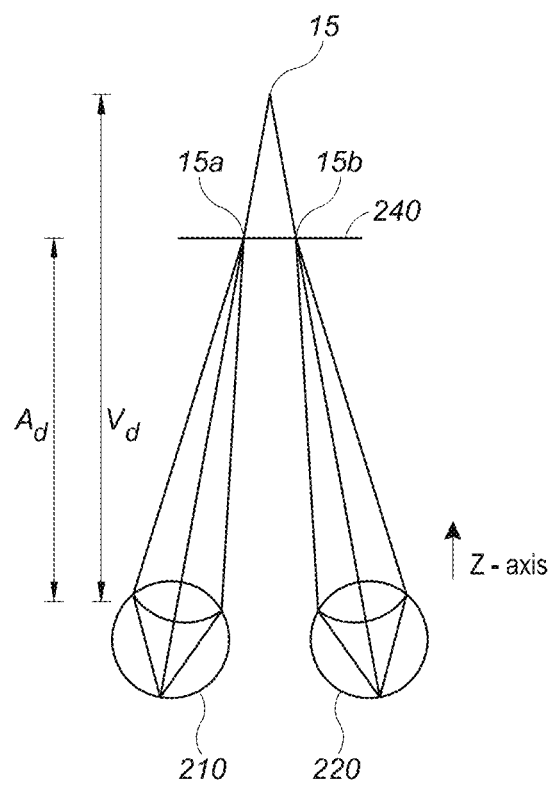
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
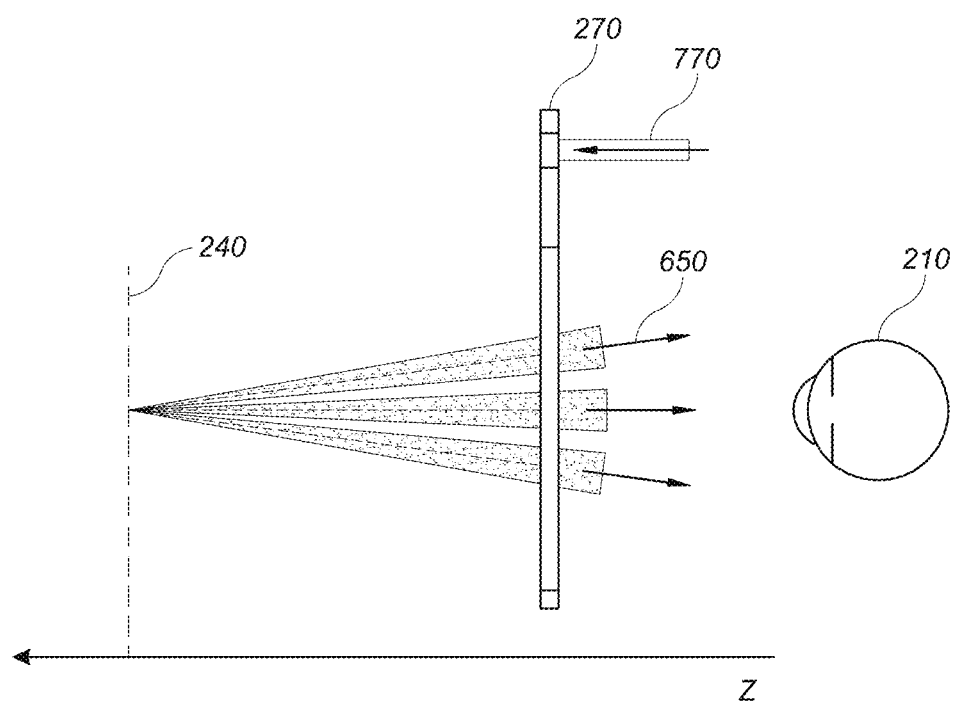
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may follow the contours of a flat or a curved surface. In some embodiments, advantageously for simplicity, the depth planes may follow the contours of flat surfaces.

Figure 6:
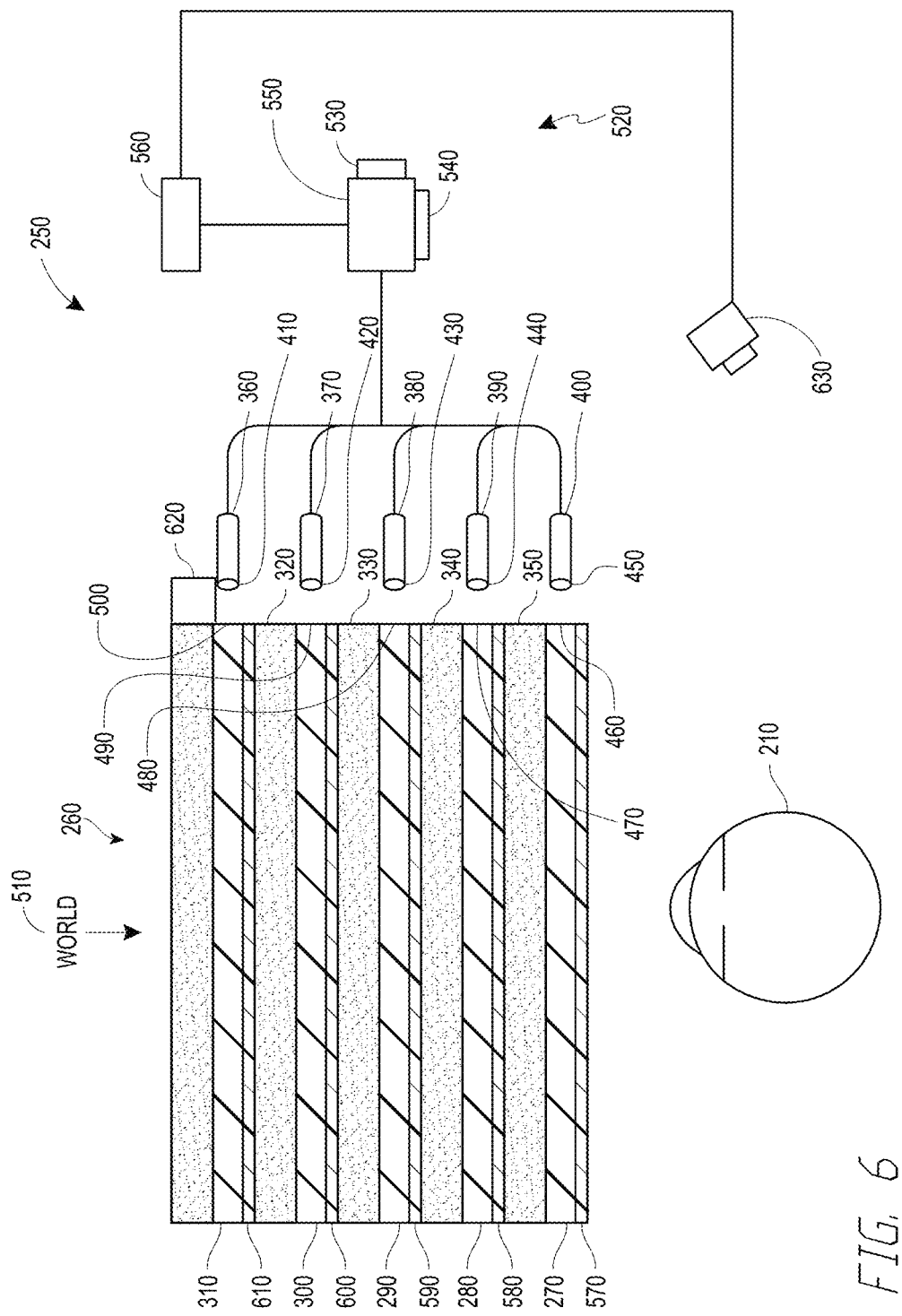
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to as light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material. As described herein, in some embodiments, the out-coupling optical elements 570, 580, 590, 600, 610 may be integrated with surface portions of the waveguides 270, 280, 290, 300, 310.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens or lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the light extracting optical elements 570, 580, 590, 600, 610 may be gratings integrated with surface portions of the waveguides 270, 280, 290, 300, 310.

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
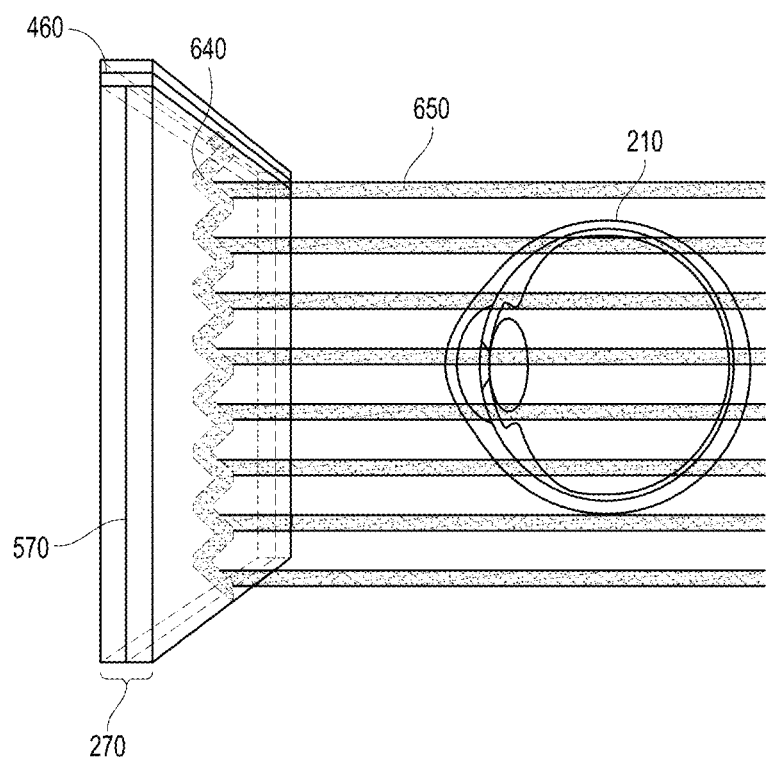
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
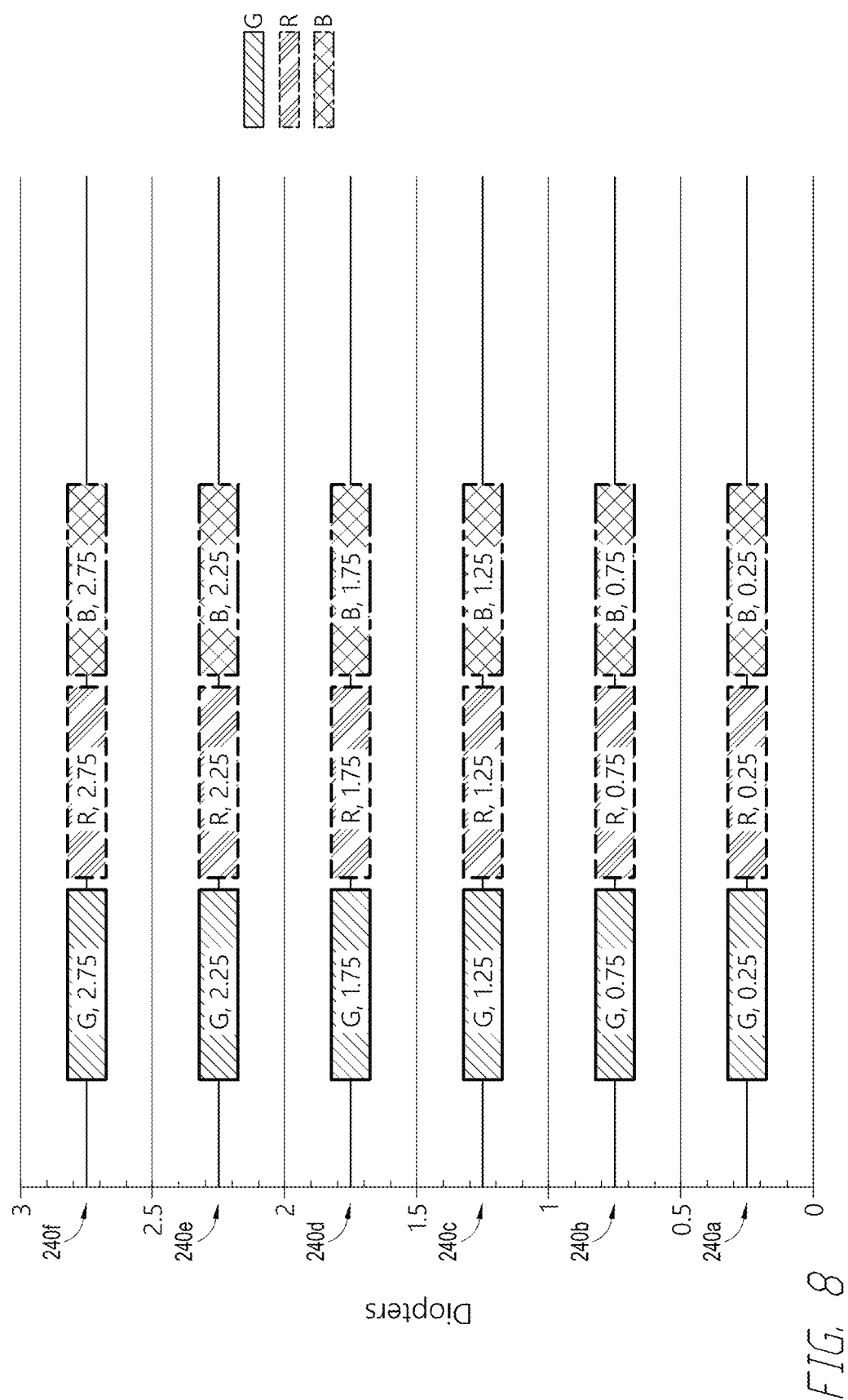
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
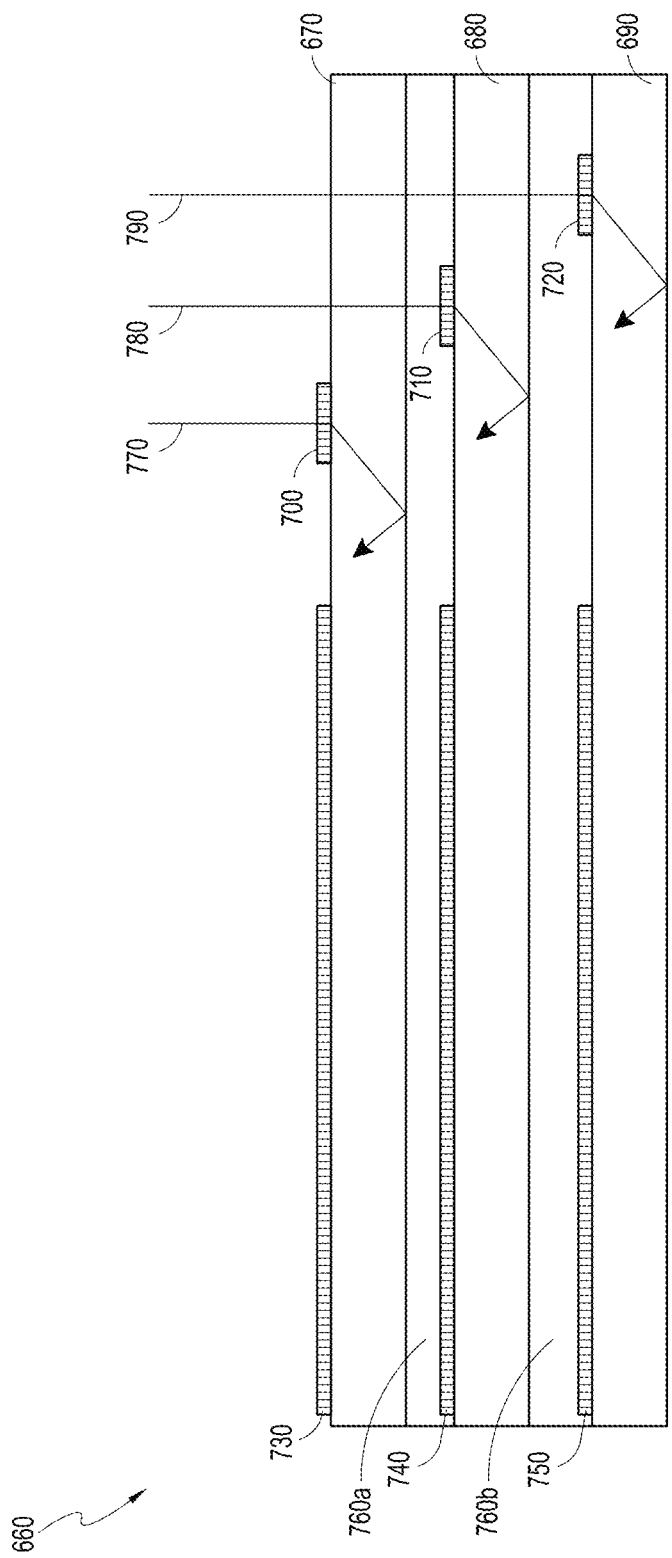
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments. As described herein, in some embodiments, the in-coupling optical elements 700, 710, 720 may be integrated with surface portions of the waveguides 670, 680, 690.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively. As described herein, in some embodiments, the light distributing elements 730, 740, 750 may be integrated with surface portions of the waveguides 670, 680, 690.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some embodiments, the layers 760*a* and 760*b* are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
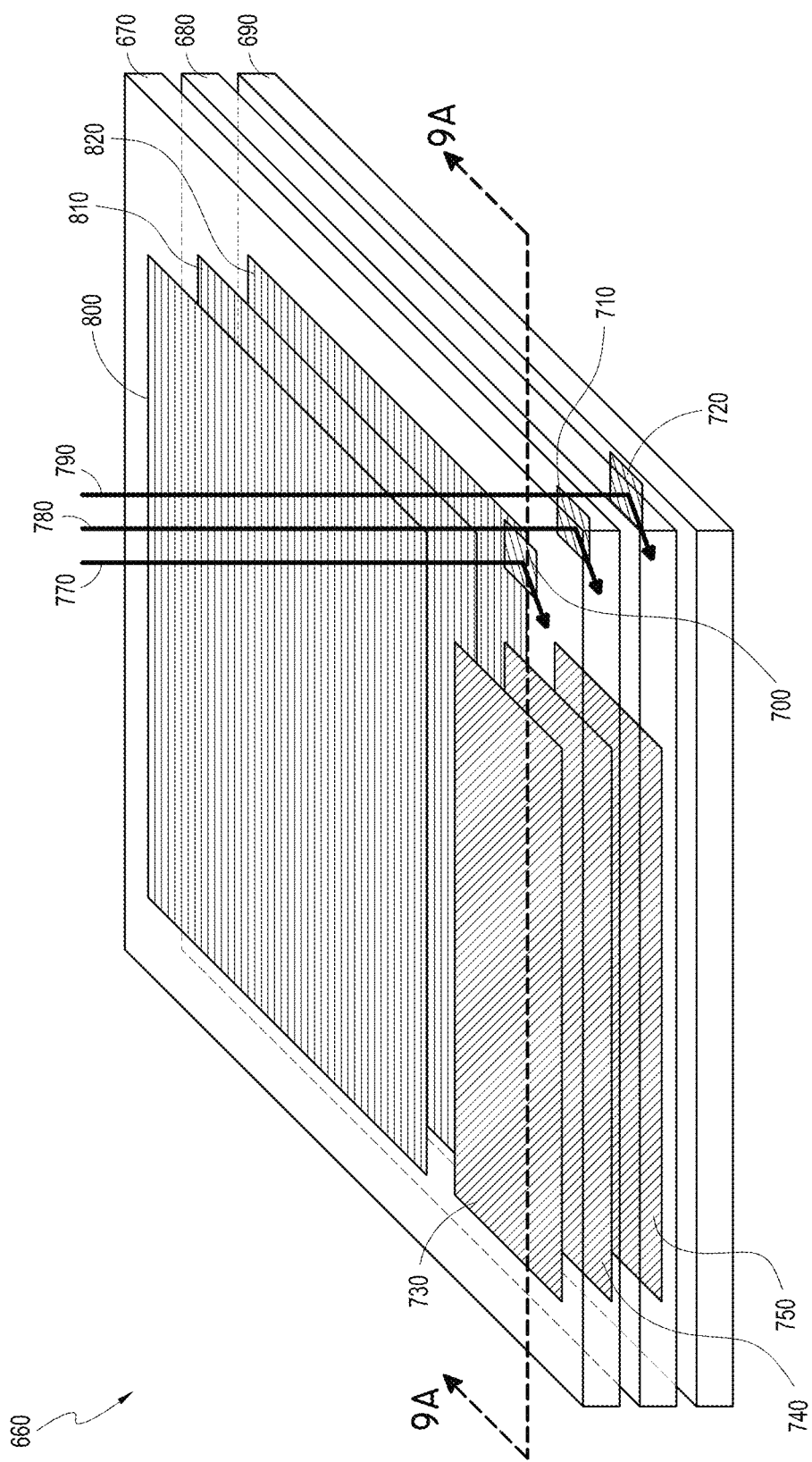
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810.

Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
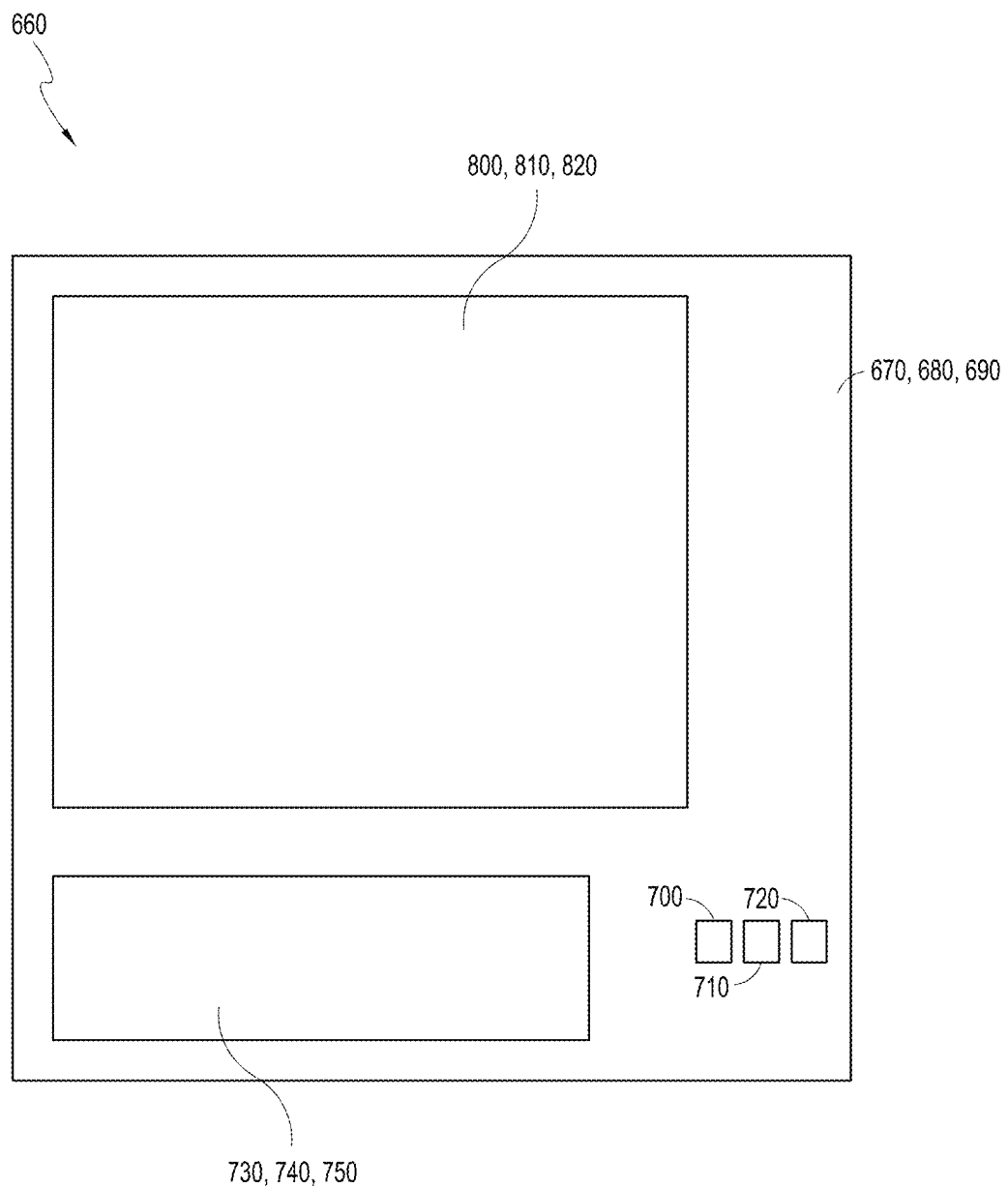
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
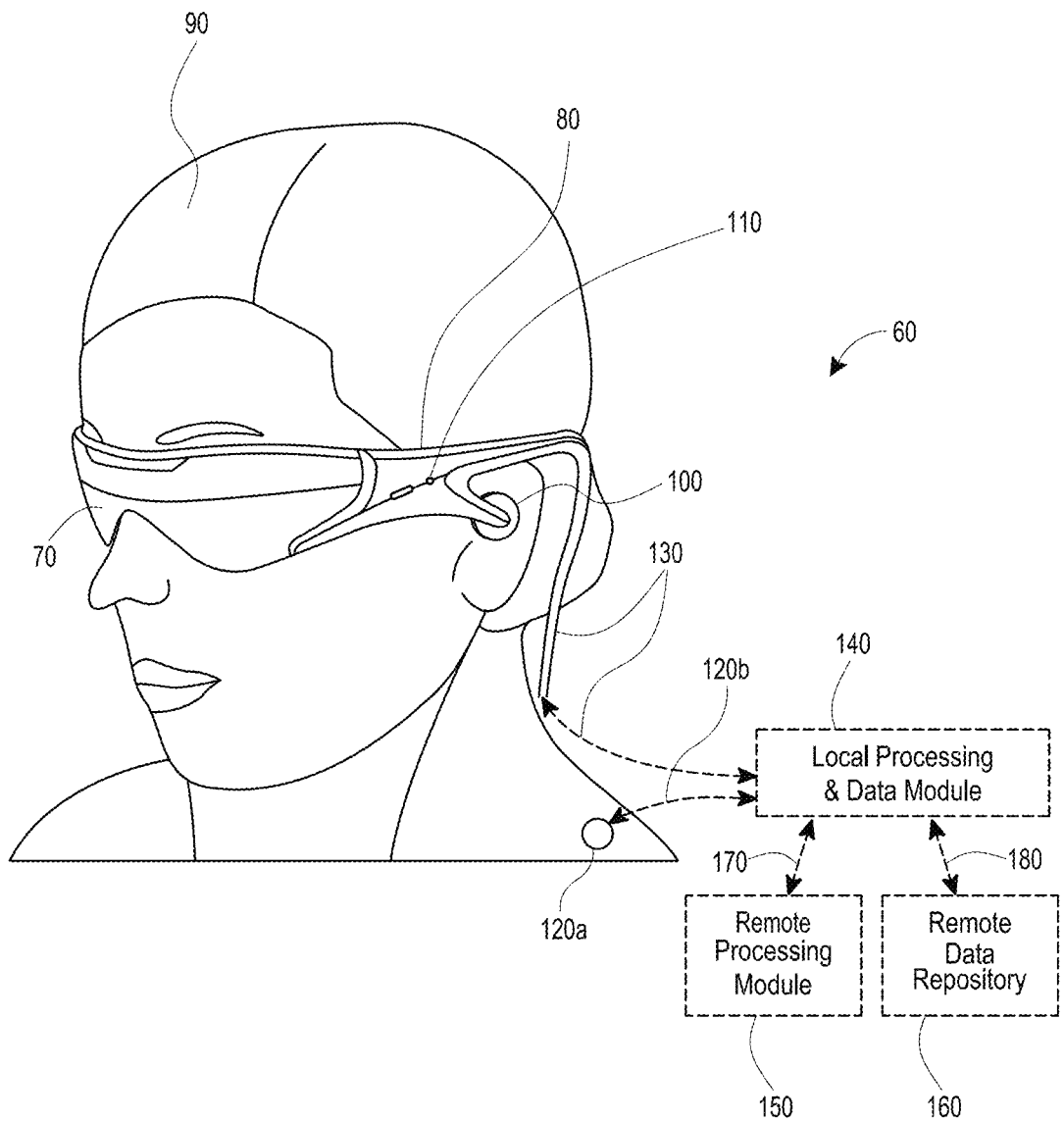
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUS), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Example Waveguides

As described with respect to FIG. 6, light containing image information can be provided to an eyepiece (an eyepiece comprising for example, a waveguide assembly 260 comprising waveguides 270, 280, 290, 300, 310) by a light projector system 520 (e.g., by image injection devices 360, 370, 380, 390, 400 of the projector system 520). Low coupling efficiency of the light between the projector system 520 and the waveguides 270, 280, 290, 300, 310 can lower the total efficiency of the waveguide assembly 260 and can degrade the overall image quality provided to the viewer. Compared to waveguides used in current display systems, certain implementations of waveguides described herein can advantageously provide higher coupling efficiency, better image quality, and/or a simpler manufacturing process.

Figure 10:
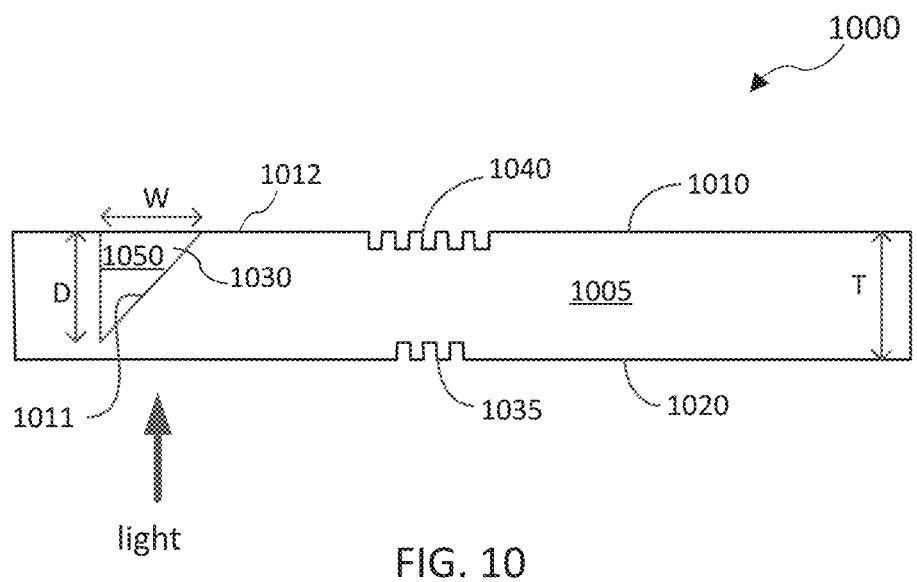
FIGS. 10, 11, 12, 13, 14, 15, and 16 illustrate example waveguides with an integrated in-coupling optical element.

Referring now to FIG. 10, an example waveguide with an integrated in-coupling optical element is illustrated. The example waveguide 1000 includes an integrated in-coupling optical element 1030 configured to couple incident light into the waveguide 1000. The light can propagate though the waveguide 1000 via total internal reflection. One or more light distributing elements 1035 can direct the light towards one or more out-coupling optical elements 1040, which can extract and direct the light out of the waveguide 1000 and into a viewer's eyes.

In various implementations, the waveguide 1000 can include a layer 1005 comprising a substantially optically transparent material. In some implementations, the layer 1005 can be highly transparent to wavelengths of light in the visible spectrum, e.g., 390-700 nm. For example, the layer 1005 can transmit from about 85% to about 100%, from about 90% to about 100%, from about 95% to about 100%, from about 96% to about 100%, from about 97% to about 100%, from about 98% to about 100% of light, in the visible light spectrum, across its thickness. In some instances, the layer 1005 may be formed of a polymer material, such as optical polymers used for ophthalmic lenses and/or transparent polymers. Some example polymers which may be used can include thiol-based polymers; MR series polymers commercially available from Mitsui Chemicals America, Inc. of Rye Brook, New York; LPB or LPL series polymers commercially available from Mitsubishi Chemical Corporation of Tokyo, Japan; or OrmoStamp commercially available from micro resist technology GmbH of Berlin, Germany. In some instances, the layer 1005 may be formed of a combination of materials, such as a first layer of a first material and a second layer of a second material. Other examples are possible.

With continued reference to FIG. 10, the layer 1005 can have a first major surface 1010 and a second major surface 1020. The first and second major surfaces 1010, 1020 can be configured such that light containing image information can propagate through the layer 1005 being guided therein. For example, the light can be guided through the layer 1005 by reflecting from the first 1010 and second 1020 major surfaces via total internal reflection from surfaces. In various implementations, the first and second major surfaces 1010, 1020 can have relatively low surface roughness. For example, in some implementations, the surface roughness can be in a range from about 0.05 nm to about 3.0 nm (such as about 0.05 nm, about 0.07 nm, about 0.1 nm, about 0.5 nm, about 1.0 nm, about 1.5 nm, about 2.0 nm, about 2.5 nm, about 3.0 nm, etc.), in any ranges within this range (such as about 0.05 nm to about 2.5 nm, about 0.07 nm to about 2.5 nm, about 0.1 nm to about 2.5 nm, about 0.5 nm to about 2.5 nm, about 0.7 nm to about 2.5 nm, about 1.0 nm to about 2.5 nm, about 0.05 nm to about 2.0 nm, about 0.07 nm to about 2.0 nm, about 0.1 nm to about 2.0 nm, about 0.5 nm to about 2.0 nm, about 0.7 nm to about 2.0 nm, about 1.0 nm to about 2.0 nm, etc.), any values within these ranges, or in any ranges formed by such values. Without being bound by theory, a waveguide with a relatively low surface roughness can retain imaging quality. Accordingly, in various implementations, the first and second major surfaces 1010, 1020 can have relatively low surface roughness such that layer 1005 can preserve image information and retain imaging.

In various implementations, the first major surface 1010 can include a first smaller surface portion 1011 and a second larger surface portion 1012 monolithically integrated with the layer 1005 and with each other 1011, 1012. In some instances, the first smaller surface portion 1011 can include at least a part of the in-coupling optical element 1030. For example, the first smaller surface portion 1011 can form at least a part of the in-coupling optical element 1030. In various implementations, the first smaller surface portion 1011 can be integrated with the in-coupling optical element 1030 such that the in-coupling optical element 1030 can be configured to efficiently couple light incident on the in-coupling optical element 1030 into the layer 1005. As described herein, the light can propagate through the layer 1005 by total internal reflection from the second major surface 1020 and the second larger surface portion 1012 of the first major surface 1010.

In some implementations, the in-coupling optical element 1030 can be configured to deflect light containing image information in the layer 1005 of the waveguide 1000. In FIG. 10, the in-coupling optical element 1030 comprises a tilted surface portion (e.g., the first smaller surface portion 1011). For example, the tilted surface portion can comprise the first smaller surface portion 1011 of the first major surface 1010 tilted with respect to the second larger surface portion 1012 of the first major surface 1010 and the second major surface 1020. The tilted surface portion 1011 can be tilted in a range from about 30 degrees to about 60 degrees with respect to a plane parallel the first 1010 and/or second 1020 major surfaces (such as about 30 degrees, about 35 degrees, about 40 degrees, about 45 degrees, about 50 degrees, about 55 degrees, about 60 degrees, etc.) in any ranges within this range (such as about 30 degrees to about 50 degrees, about 35 degrees to about 50 degrees, about 40 degrees to about 50 degrees, about 30 degrees to about 55 degrees, about 40 degrees to about 55 degrees, etc.), any values within these ranges, or in any ranges formed by such values. In some embodiments, the angle of tilt can be based at least in part on the thickness T of layer 1005 of the waveguide 1000.

In some implementations, the tilted surface portion 1011 can form a part of an indentation (or facet) 1050 in the layer 1005. With continued reference to FIG. 10, the indentation 1050 can have a depth D (or height) and width W. In some implementations, the depth D of the indentation 1050 can be less than the thickness T of the layer 1005. In some instances, the depth D of the indentation 1050 can be at least half the thickness T or at least three quarters the thickness T of the layer 1005. For example, the indentation 1050 can have a depth D of about 0.5T, about 0.6T, about 0.75T, about 0.8T, about 0.9T, etc. or can have a depth D in any ranges formed by such values. Other values and ranges are possible. In some implementations, the indentation 1050 can have a depth D substantially equal to the thickness T of the layer 1005.

In some instances, the depth D of the indentation 1050 can be in a range from about 50 microns to about 550 microns (such as about 50 microns, about 75 microns, about 100 microns, about 150 microns, about 200 microns, about 250 microns, about 300 microns, about 350 microns, about 400 microns, about 450 microns, about 500 microns, about 550 microns, etc.), in any ranges within this range (such as about 50 microns to about 500 microns, about 75 microns to about 500 microns, about 100 microns to about 500 microns, about 75 microns to about 550 microns, about 100 microns to about 550 microns, about 150 microns to about 550 microns, etc.), any values within these ranges, or in any ranges formed by such values. In some instances, the depth D of the indentation 1050 can be outside these ranges.

In some instances, the width W of the indentation 1050 can be in a range from about 25 microns to about 350 microns (such as about 30 microns, about 40 microns, about 50 microns, about 75 microns, about 100 microns, about 150 microns, about 200 microns, about 250 microns, about 300 microns, about 350 microns, etc.), in any ranges within this range (such as about 25 microns to about 300 microns, about 50 microns to about 300 microns, about 75 microns to about 300 microns, about 30 microns to about 350 microns, about 40 microns to about 350 microns, about 50 microns to about 350 microns, about 75 microns to about 350 microns, etc.), any values within these ranges, or in any ranges formed by such values. In some instances, the width W of the indentation 1050 can be outside these ranges.

In some implementations, the indentation 1050 can comprise air. Alternatively, the indentation 1050 can comprise the same material as layer 1005 or another substantially optically transparent material (e.g., a material with substantially similar refractive index). In some such implementations, the indentation 1050 can form at least part of a prism (e.g., a triangular prism) having a depth D and width W as described herein with the tilted surface portion 1011 forming one of the surfaces of the prism. Accordingly, some implementations of waveguides can include an integrated in-coupling optical element 1030 in the form of a prism. In various implementations, the prism can be configured to reflect the light containing the image information in the layer 1005 of the waveguide 1000. For example, in some implementations, the prism can be configured to reflect light by total internal reflection as light strikes a surface of the prism at an angle greater than the critical angle.

Conventional gratings used as an in-coupling element can potentially result in non-uniform brightness of an image due to differing diffraction efficiencies with respect to input angle. Advantageously, in various implementations, an in-coupling optical element 1030 comprising a prism can achieve higher uniform reflectivity with respect to input angle (extremely uniform reflectivity in some instances), and thus can improve the brightness uniformity of the display's output image. In addition, in certain implementations described herein, an in-coupling optical element 1030 comprising an integrated prism of the same material as the waveguide (or a material with substantially similar refractive index) can achieve near-perfect index-matching with the waveguide (or substantially similar index-matching) without an interface (e.g., a rough surface) between the prism and the waveguide material. In some such implementations, the in-coupling optical element 1030 can reduce back reflection into the projector (achieve extremely low back reflection in some instances), and thus reduce ghost image artifacts (no ghosting in some instances). Furthermore, the in-coupling optical element 1030 comprising a prism integrated with a surface 1011 of the waveguide 1000 can allow direct contact with the waveguide 1000, leading to increased in-coupling between a light projector and waveguide 1000, and can simplify the manufacturing process by simplifying and/or eliminating the alignment step between the prism and waveguide during assembly.

Figure 11:
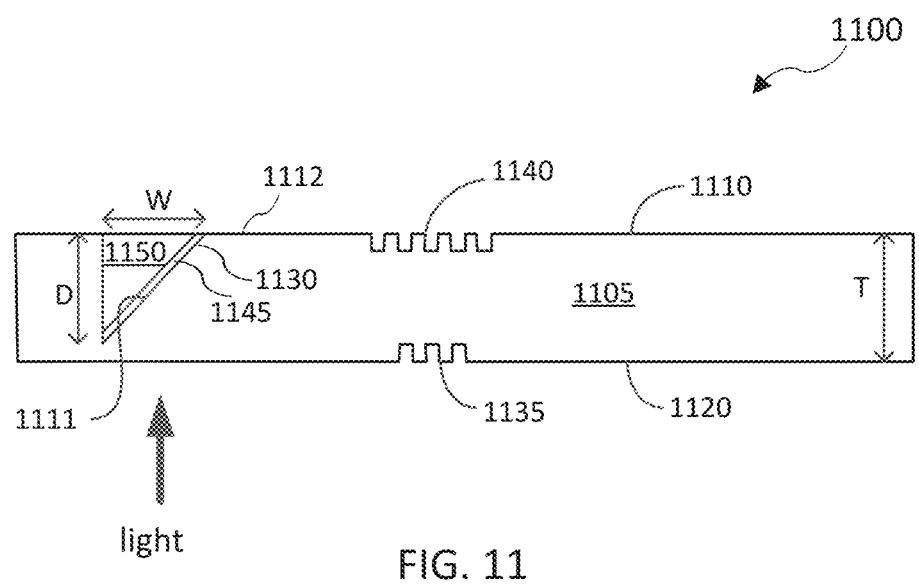

FIG. 11 illustrates another example waveguide with an integrated in-coupling optical element. The example waveguide 1100 is similar to the example waveguide 1000 in FIG. 10 (e.g., first major surface 1110, second major surface 1120, layer 1105, indentation 1150, one or more light distributing elements 1135, one or more out-coupling optical elements 1140, etc.), except the tilted surface portion 1111 can form at least part of a turning mirror. For example, in some implementations, the in-coupling optical element 1130 can include a layer 1145 of reflective material (e.g., metallization) disposed on the tilted surface portion 1111. In some instances, the reflective layer 1145 can include a metal film (e.g., Au, Al, Ag, or any reflective metal). The thickness of the metal film can be in a range from about 5 nm to about 500 nm (such as about 5 nm, about 10 nm, about 20 nm, about 30 nm, about 40 nm, about 50 nm, about 75 nm, about 100 nm, about 150 nm, about 200 nm, about 250 nm, about 300 nm, about 350 nm, about 400 nm, about 450 nm, about 500 nm, etc.), in any ranges within this range (such as about 5 nm to about 400 nm, about 5 nm to about 450 nm, about 10 nm to about 400 nm, about 10 nm to about 450 nm, about 5 nm to about 500 nm, about 10 nm to about 500 nm, about 50 nm to about 500 nm, about 100 nm to about 500 nm, etc.), any values within these ranges, or in any ranges formed by such values. In some implementations, the indentation 1150 may be filled with reflective material or filler. The in-coupling optical element 1130 comprising a turning mirror (e.g., a metallized tilted surface portion) can be configured to reflect the light containing image information in the layer 1105 of the waveguide 1100. An in-coupling optical element 1130 comprising a turning mirror integrated with a surface of the waveguide 1100 can allow direct contact with the waveguide 1100, leading to increased in-coupling between a light projector and waveguide, and can simplify the manufacturing process by simplifying and/or eliminating the alignment step between the turning mirror and waveguide during assembly.

In some implementations, the tilted surface portion 1111 may extend completely through the thickness of the waveguide layer 1105 such that the tilted surface portion 1111 is an edge (e.g., a surface extending between the major surfaces) of the waveguide layer 1105 instead of a portion of the first major surface 1110. In other words, in some implementations, the in-coupling optical element 1130 can be integrated with an edge of the waveguide layer 1105 instead of a major surface 1110.

Figure 12:
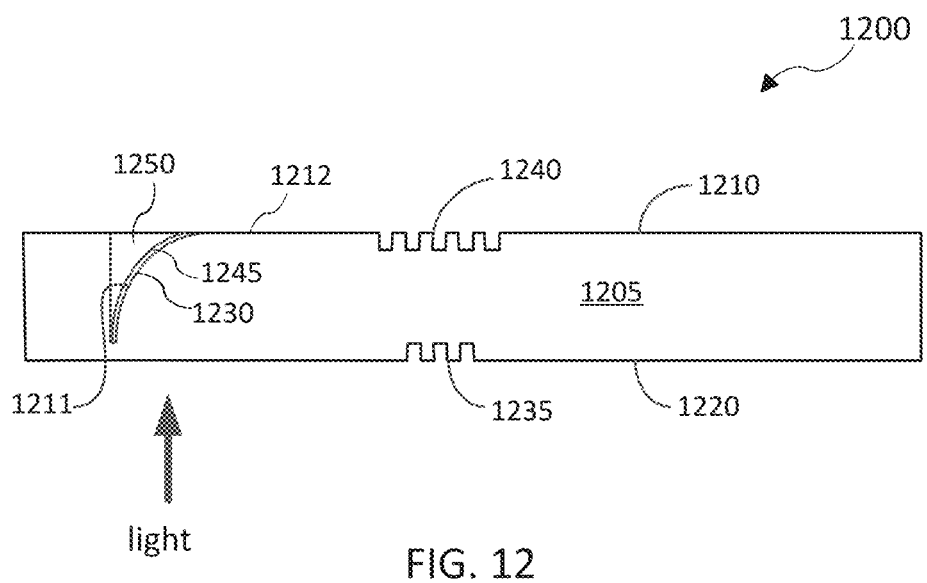

FIG. 12 illustrates another example waveguide with an integrated in-coupling optical element. The example waveguide 1200 is similar to the example waveguide 1100 in FIG. 11 (e.g., first major surface 1210, second major surface 1220, layer 1205, indentation 1250, one or more light distributing elements 1235, one or more out-coupling optical elements 1240, etc.), except the tilted surface portion 1211 of the in-coupling optical element 1230 has curvature. For example, in the in-coupling optical element 1230 illustrated in FIG. 12, the first smaller surface portion 1211 of the first major surface 1210 is curved with respect to the second larger surface portion 1212 of the first major surface 1210 and the second major surface 1220. As another example, the curved surface portion 1211 may be an edge portion of the waveguide 1205.

In various implementations, the in-coupling optical element 1230 comprising a turning mirror (e.g., a metallized curved surface portion) can be configured to reflect the light containing image information in the layer 1205 of the waveguide 1200. In some implementations, the curved surface portion 1211 can be configured to provide optical power (e.g., a powered turning mirror). In some implementations, the curved surface portion 1211 can supplement the optical power of other components (e.g., supplement the optical power of the exit pupil expanders) and/or make the optical power of other components unnecessary. In some examples, the curved surface portion 1211 can be configured to provide positive optical power. In some such implementations, the tilted surface portion 1211 can have concave curvature from the perspective of most locations within the substantially optically transparent layer 1205. As another example, the curved surface portion 1211 can be configured to provide negative optical power. In some such implementations, the tilted surface portion 1211 can have a convex curvature from the perspective of most locations within the layer 1205.

Figure 13:
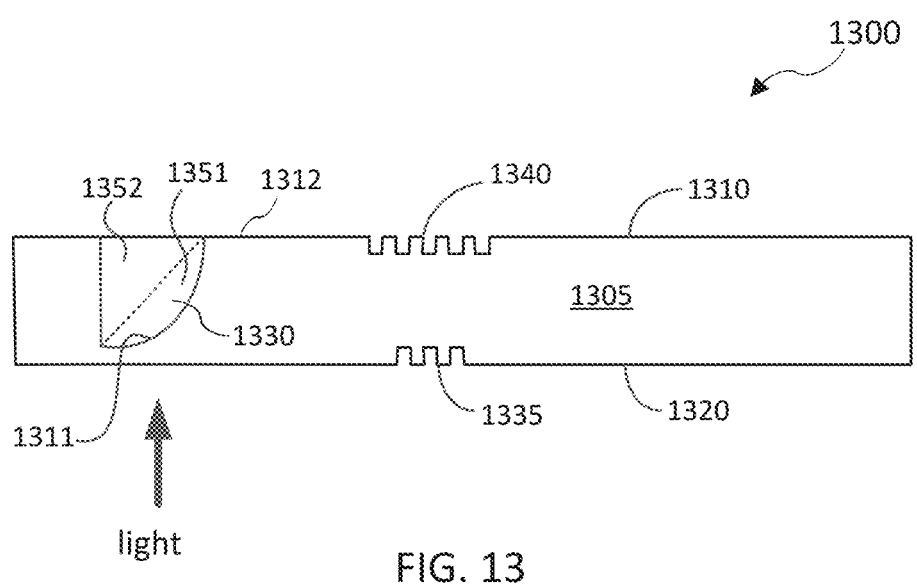

FIG. 13 illustrates another example waveguide with an integrated in-coupling optical element. In the example waveguide 1300, the curved surface portion 1311 can form at least part of a lens 1351 (e.g., a spherical, cylindrical, parabolic, freeform lens, etc.) of an integrated prism 1352 and lens 1351. In the in-coupling optical element 1330 illustrated in FIG. 13, the first smaller surface portion 1311 of the first major surface 1310 is curved with respect to the second larger surface portion 1312 of the first major surface 1310 and the second major surface 1320. In some implementations, the curved surface portion 1311 can be convex as seen from most of the waveguide 1305. In some examples, the curved surface portion 1311 can form a positive powered lens. In some implementations, the curved surface portion 1311 can be concave as seen from most of the waveguide 1305. In some examples, the curved surface portion 1311 can form a negative powered lens. In various implementations, the integrated prism 1352 and lens 1351 can be configured to direct the light containing the image information in the layer 1305 of the waveguide 1300. For example, in some implementations, the prism 1352 can be configured to reflect light by total internal reflection as light strikes a surface of the prism 1352 at an angle greater than the critical angle, and the lens 1351 can be configured to focus and/or refract light into the layer 1305. Forming at least part of a lens 1351 with a surface 1311 of the waveguide 1300 can improve the coupling of light between a light projector and waveguide, and can simplify assembly by eliminating the alignment step between the lens and waveguide.

Figure 14:
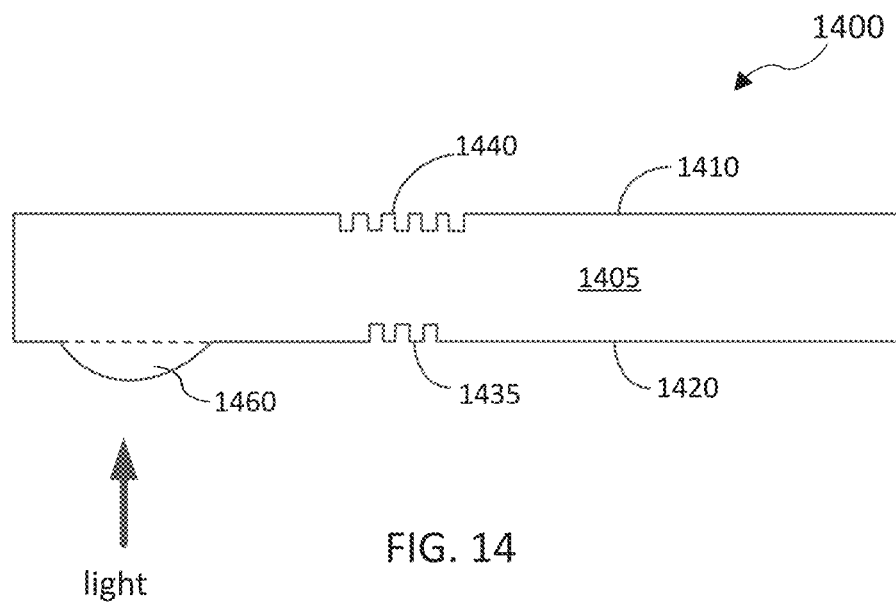

FIG. 14 illustrates another example waveguide with at least part of a lens 1460 integrated with the waveguide 1400. In the example illustrated in FIG. 14, the entire lens 1460 is monolithically integrated with the waveguide 1400. Although the lens 1460 is illustrated as integrated with a major surface 1420 of the waveguide layer 1405, in some implementations, the lens 1460 can be integrated with an edge of the waveguide layer. In addition to improving coupling of light and simplifying assembly, monolithically integrating a lens with the waveguide can reduce the total footprint (e.g., size and/or weight) of a waveguide display device by eliminating a lens component in the projector and/or a lens component between the projector and waveguide. In some implementations, the lens 1460 can comprise of a spherical, cylindrical, parabolic, or freeform lens. Any shapes are possible. In some instances, the lens 1460 can be a convex lens. In some examples, the lens 1460 can provide positive optical power. In some implementations, the lens 1460 can be a concave lens. In some examples, the lens 1460 can provide negative optical power.

Figure 15:
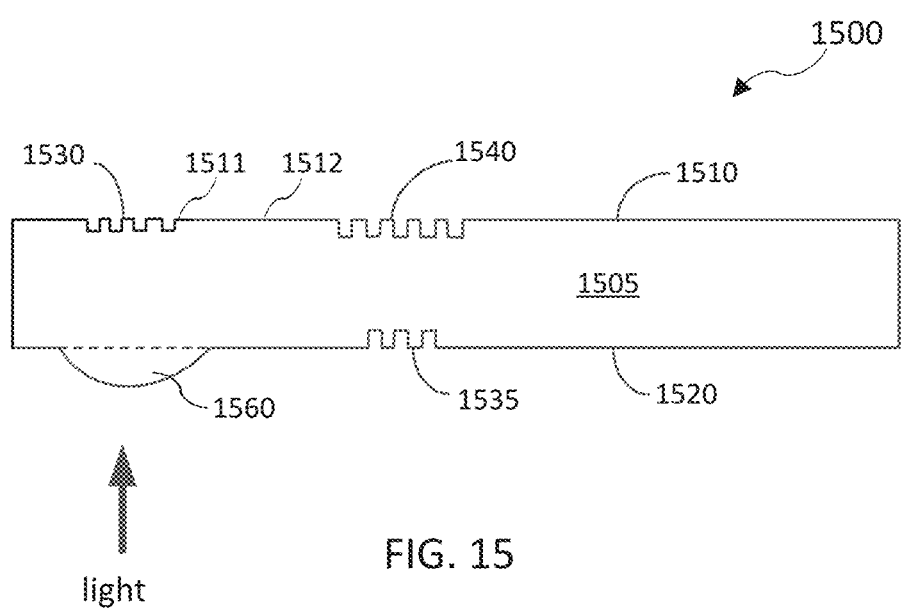

In some implementations, the lens 1460 can be aligned with another in-coupling optical element. For example, as illustrated in FIG. 15, the in-coupling optical element 1530 can be configured to turn light into layer 1505 after passing through the lens 1560. In some instances, the in-coupling optical element 1530 can be disposed on a surface 1510 of the layer 1505 opposite the surface 1520 on which the lens 1560 is disposed. In some other instances, the in-coupling optical element 1530 can be disposed on a surface adjacent the surface on which the lens is disposed. In some other instances, the in-coupling optical element 1530 can be disposed on the same surface on which the lens is disposed. In some implementations, the in-coupling optical element 1530 can be integrated with a surface of the waveguide 1500. For example, the in-coupling optical element 1530 can include any of the in-coupling optical elements described herein (e.g., an integrated facet, prism, turning mirror, lens, or a combination thereof).

As another example, the in-coupling optical element 1530 can include an integrated grating. For instance, in some implementations, a first smaller surface portion 1511 of the first major surface 1510 can form at least part of a grating (e.g., the first smaller surface portion 1511 can include undulating surface relief). The grating can be a reflective grating. In some instances, the linewidth of the grating can be in a range from about 25 nm to about 550 nm (such as about 25 nm, about 50 nm, about 60 nm, about 70 nm, about 75 nm, about 100 nm, about 150 nm, about 200 nm, about 250 nm, about 300 nm, about 350 nm, about 400 nm, about 450 nm, about 500 nm, about 550 nm, etc.), in any ranges within this range (such as about 25 nm to about 400 nm, about 50 nm to about 400 nm, about 25 nm to about 450 nm, about 50 nm to about 450 nm, about 25 nm to about 500 nm, about 50 nm to about 500 nm, about 75 nm to about 500 nm, about 100 nm to about 500 nm, about 50 nm to about 550 nm, about 75 nm to about 550 nm, etc.), any values within these ranges, or in any ranges formed by such values. Other examples are possible.

In some instances, the pitch of the grating can be in a range from about 150 microns to about 650 microns (such as about 150 microns, about 200 microns, about 250 microns, about 300 microns, about 350 microns, about 400 microns, about 450 microns, about 500 microns, about 550 microns, about 600 microns, about 650 microns, etc.), in any ranges within this range (such as about 150 microns to about 500 microns, about 150 microns to about 550 microns, about 150 microns to about 600 microns, about 200 microns to about 500 microns, about 200 microns to about 550 microns, about 200 microns to about 600 microns, etc.), any values within these ranges, or in any ranges formed by such values. Other examples are possible.

Other examples of in-coupling optical elements can be integrated with a surface of the waveguide. In addition, although various implementations are described herein as in-coupling optical elements, other optical elements can also be integrated with a surface of the waveguide. For example, light distributing elements 1035, 1135, 1235, 1335, 1435, 1535 and/or out-coupling optical elements 1040, 1140, 1240, 1340, 1440, 1540 can be integrated with a surface of the waveguide. Further, although various implementations of light distributing elements 1035, 1135, 1235, 1335, 1435,

1535 and/or out-coupling optical elements 1040, 1140, 1240, 1340, 1440, 1540 are illustrated as gratings, the light distributing elements and/or the out-coupling optical elements can be any of the integrated optical elements described herein.

Figure 16:
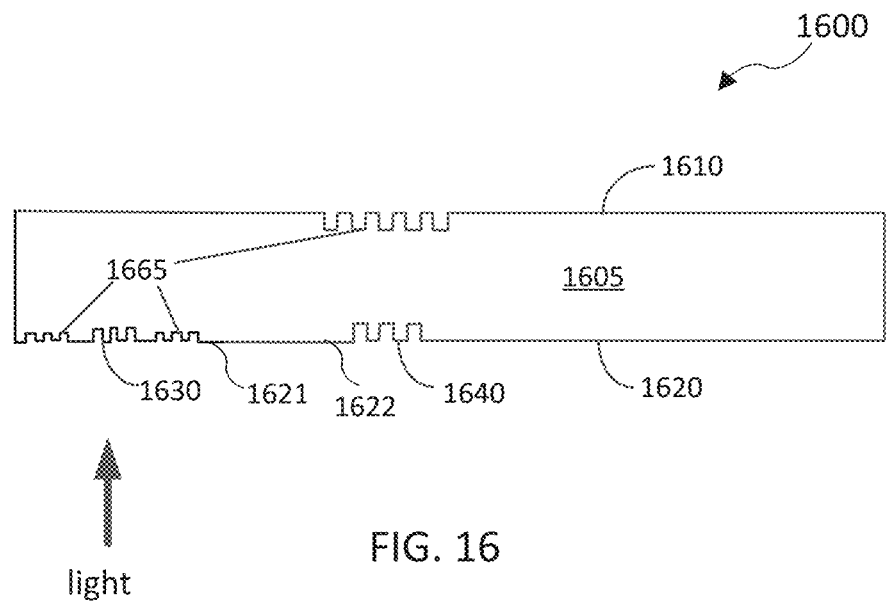

Some implementations can include one or more anti-reflective structures to reduce reflections when the viewer is viewing through the waveguide. For example, as shown in FIG. 16 anti-reflective structures 1665 are provided adjacent the in-coupling optical element 1630. One or more anti-reflective structures 1665 can also be provided adjacent and/or opposing an out-coupling optical element 1640 (or a light distributing element). One or more anti-reflective structures 1665 can be provided on any surface portion of the waveguide 1600. In FIG. 16, the in-coupling optical element 1630 and the out-coupling optical element 1640 are illustrated as gratings integrated with a surface 1620 of the waveguide 1600 (e.g., similar to grating 1530 shown in FIG. 15). In various implementations, the optical elements (e.g., in-coupling optical element, the out-coupling optical element, and/or the light distributing element) can be any of the integrated optical elements described herein.

With conventional anti-reflective coatings, multiple layers of coatings are usually provided, and it may be challenging to surround a grating with such layers. Further, there are generally costs associated with providing each additional layer of conventional anti-reflective coating. In various implementations, at least a part of an anti-reflective structure can also be integrated with a surface of the waveguide (and can surround a grating in some implementations). For example, a surface portion 1621 of the waveguide 1600 can form at least part of the anti-reflective structure 1665. In some implementations, the anti-reflective structure 1665 can include a surface relief pattern. For instance, the anti-reflective structure 1665 can comprise an undulating pattern. In some implementations, the undulating pattern can undulate in one dimension or one direction. In some implementations, the undulating pattern can undulate in two dimensions or two directions. The undulating pattern can include a periodic pattern. For example, the period of the pattern can be in a range from about 25 nm to about 250 nm (such as about 25 nm, about 50 nm, about 75 nm, about 100 nm, about 125 nm, about 150 nm, about 175 nm, about 200 nm, about 250 nm, etc.), in any ranges within this range (such as about 25 nm to about 200 nm, about 50 nm to about 200 nm, about 75 nm to about 200 nm, about 100 nm to about 200 nm, about 50 nm to about 250 nm, about 75 nm to about 250 nm, about 100 nm to about 250 nm, etc.), any values within these ranges, or in any ranges formed by such values. In some implementations, the pitch of the anti-reflective structure 1665 can be such that the anti-reflective structure 1665 is not diffractive to visible light. Other examples are possible.

In some instances, the height of the pattern can be in a range from about 5 nm to about 250 nm (such as about 5 nm, about 10 nm, about 20 nm, about 30 nm, about 50 nm, about 75 nm, about 100 nm, about 125 nm, about 150 nm, about 175 nm, about 200 nm, about 250 nm, etc.), in any ranges within this range (such as about 5 nm to about 200 nm, about 10 nm to about 200 nm, about 50 nm to about 200 nm, about 10 nm to about 250 nm, about 50 nm to about 250 nm, about 75 nm to about 250 nm, about 100 nm to about 250 nm, etc.), any values within these ranges, or in any ranges formed by such values. Other examples are possible.

Figures 16A, 16B:
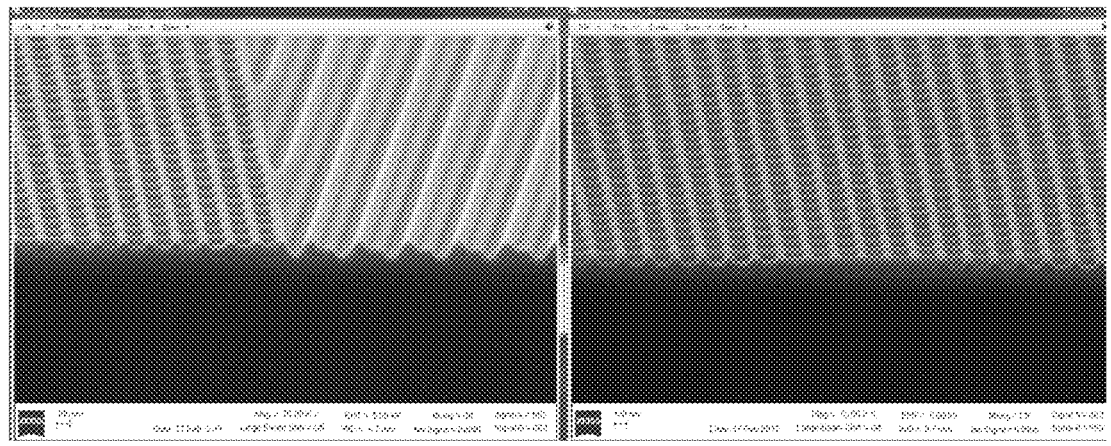
FIG. 16A shows a magnified image of an example anti-reflective structure adjacent to an example in-coupling optical element.
FIG. 16B shows a magnified image of the example anti-reflective structure.

FIG. 16A shows a magnified image of an example anti-reflective structure adjacent an in-coupling grating. FIG. 16B shows a magnified image of the example anti-reflective structure. As shown in these figures, nanostructures can be integrated with a surface of the waveguide. In various implementations, the extremely small sizes can have an effective index with air such that the structure can act similar to an anti-reflective coating. An anti-reflective structure that is integrated into a surface portion of the waveguide can advantageously be selectively provided on desired portions of the waveguide. For example, one or more anti-reflective structures can be provided to surround an in-coupling grating.

In some implementations, the anti-reflective structure can include material disposed on the surface relief pattern. For instance, in some examples, the material can have a desired index of refraction. In some implementations, the anti-reflective structure can reduce (and/or minimize in some instances) the reflection of the image generated by an adjacent waveguide. In some implementations, the anti-reflective structure can reduce (and/or minimize in some instances) the phase retardation as light impinges on a surface.

An anti-reflective structure can be optically aligned with an optical element. In some instances, an anti-reflective structure can be optically aligned with an optical element associated with another waveguide. For example, the anti-reflective structure 1665 can be configured to facilitate passage of light through the waveguide 1600 to another waveguide. With reference to FIG. 9A, various implementations may include a stack 660 of waveguides 670, 680, 690. As illustrated in FIG. 9A, the in-coupling optical elements 700, 710, 720 can be laterally offset from one another such that each in-coupling optical element 700, 710, 720 can receive light without that light passing through another in-coupling optical element 700, 710, 720. Additionally, an anti-reflective structure can be optically aligned with an in-coupling optical element associated with another waveguide. For example, an anti-reflective structure (e.g., 1665 shown in FIG. 16) can be positioned on waveguide 670 above an in-coupling optical element (e.g., 710 in FIG. 9A) for waveguide 680 such that light 780 can transmit through the anti-reflective structure and waveguide 670 and be incident on the in-coupling optical element 710 for coupling into waveguide 680. As another example, an anti-reflective structure can be configured to reduce (and/or minimize in some instances) reflection from light out-coupled from a waveguide and directed to the user. In some implementations, an anti-reflective structure can be optically aligned with an out-coupling optical element and/or light distributing element. Referring to FIG. 9A, since light out-coupled by waveguide 680 passes through waveguide 670, an anti-reflective structure can be positioned on the side of waveguide 670 nearest to waveguide 680. Other examples are possible.

As described herein, various implementations can include an integrated optical element. For example, some implementations can include a surface portion that forms at least a part of the optical element (e.g., in-coupling optical element, light distributing element, out-coupling optical element, anti-reflective structures, etc.). In some implementations, at least part of the optical element can be formed when forming the surfaces of the waveguide. As an example, some implementations can be molded such that at least a part of the optical element can be formed into a surface of the waveguide. For instance, with reference to FIG. 16, some implementations can include a waveguide comprising a molded layer 1605 of substantially optically transparent material. Surface portions 1621, 1622 can be monolithically integrated with the molded layer 1605 and with each other 1621, 1622. One 1621 of the surface portions can include at least a part of a molded optical element 1630. In some examples, the layer 1605, the surfaces 1610, 1620, and the surface relief pattern 1665 can form a molded optic. The waveguides 1000, 1100, 1200, 1300, 1400, 1500 in FIGS. 10 to 15 can also be molded. In some examples, the layer (e.g., 1005, 1105, 1205, 1305, 1405, 1505), the first surfaces (e.g., 1010, 1110, 1210, 1310, 1410, 1510), the second surfaces (e.g., 1020, 1120, 1220, 1320, 1420, 1520), and at least a part of the optical element (e.g., tilted surface portion 1011, 1111, curved surface portion 1211, 1311, lens 1460, 1560, grating 1530) can form a single molded optic.

Any of the waveguides 1000, 1100, 1200, 1300, 1400, 1500, 1600, or combinations thereof, may be utilized as one of the waveguides of the waveguide stacks 260 (FIG. 6) or 660 (FIGS. 9A-9C), e.g., as one of the waveguides 270, 280, 290, 300 or 310 (FIG. 6) or 670, 680, or 690 (FIGS. 9A-9C). In addition, any of the optical elements described herein can be provided on any of the waveguides. For example, any of the optical elements 1030, 1130, 1230, 1330, 1460, 1530, 1560, 1630 may correspond to any of the in-coupling optical elements 700, 710, or 720 (FIGS. 9A-9C), the light distributing elements 730, 740, or 750 and/or out-coupling optical elements 570, 580, 590, 600, or 610 (FIG. 6) or 800, 810, or 820 (FIGS. 9A-9C). As another example, any of the optical elements 1030, 1130, 1230, 1330, 1460, 1530, 1560, 1630 may correspond to any of the features (e.g., lenses) 320, 330, 340, 350, 360, or 620 (FIG. 6). In some implementations, one or more anti-reflective structures 1665 may be provided on any of the waveguides 270, 280, 290, 300, or 310 (FIG. 6) or 670, 680, or 690 (FIGS. 9A-9C). Further, although some implementations have described the optical elements 1030, 1130, 1230, 1330, 1460, 1530, 1560, 1630, 1665 as integrated with a major surface of a waveguide, any of the optical elements 1030, 1130, 1230, 1330, 1460, 1530, 1560, 1630, 1665 can be integrated with an edge of a waveguide (e.g., a surface extending between the major surfaces).

Example Methods of Making Waveguides

As described herein, at least part of an optical element (e.g., at least part of an in-coupling optical element, a light distributing element, an out-coupling optical element, an anti-reflective structure, etc.) may be integrated with the waveguide layer. As described herein, at least part of the waveguide surface can form at least a part of the optical element, which can simplify the manufacturing of the waveguide and devices/systems incorporating the waveguides (e.g., fewer steps and/or fewer, if any, alignment issues). By forming at least a part of the optical element with a surface portion of the waveguide, at least a part of the optical element can be perfectly index-matched with the waveguide layer and without an interface therebetween. Further, in some implementations, by forming at least a part of the optical element with a surface portion of the waveguide, optical elements can be formed on selective portions of the waveguide.

In various implementations, the waveguide layer (e.g., 1005, 1205, 1305, 1405, 1505, 1605) may be formed using a flowable material. At least part of an optical element may be integrated with the waveguide layer by imprinting and subsequently hardening or curing of the imprinted material. As an example method, the waveguide can be formed by molding as described herein. Other types of molding can be used such as injection molding. Inkjet, lithography, and/or nano-imprinting can also be used in some implementations, e.g., to include optical elements such as lenses and/or prisms. In various implementations, the method can be used to form a variety of shapes and sizes (e.g., macro-level, micro-level, and/or nano-level sized features) and to form well-aligned features. Some implementations can also achieve relatively flat surfaces (e.g., low surface roughness) without additional post processing steps (e.g., without polishing). Further, some implementations can be performed repetitively and relatively inexpensively (e.g., inexpensive materials, equipment, and operation).

Figure 17A:
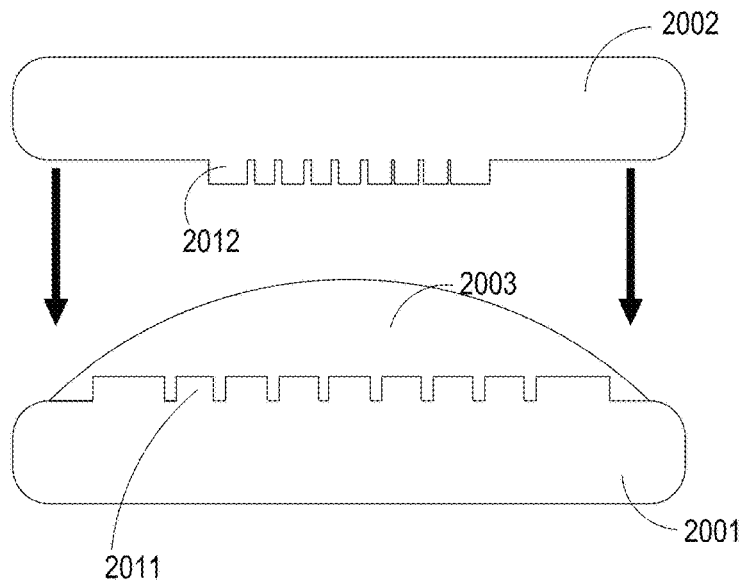
FIGS. 17A, 17B, 17C, and 17D illustrate an example method of forming a waveguide with an integrated optical element.

FIGS. 17A-17D illustrate an example method of forming a waveguide with an integrated optical element. With reference to FIG. 17A, a pair of molds 2001, 2002 configured to face one another is provided. At least one of the molds 2001, 2002 can comprise an imprint 2011, 2012 of at least a part of an optical element. The imprint 2011, 2012 may be the negative of the desired portion of the optical element to be defined in the waveguide layer to be formed. For simplicity, the molds 2001, 2002 are illustrated as having a pattern of raised features, e.g., to form one or more integrated gratings and/or anti-reflective structures as described herein. In some other implementations, the imprint may be the negative of at least a part of a prism, lens, integrated prism and lens, and/or a turning mirror (tilted and/or curved) as described herein. It will be appreciated that the imprints can be provided on the molds 2001, 2002 to form any optical element, any combination of optical elements, and/or any additional structures as desired. With continued reference to FIG. 17A, a mass of material 2003 for forming the waveguide layer can be deposited on mold 2001 (e.g., between molds 2001, 2002). As described herein, the material 2003 can be a flowable material. For example, the material 2003 can be a polymer (e.g., a resin).

Figure 17B:
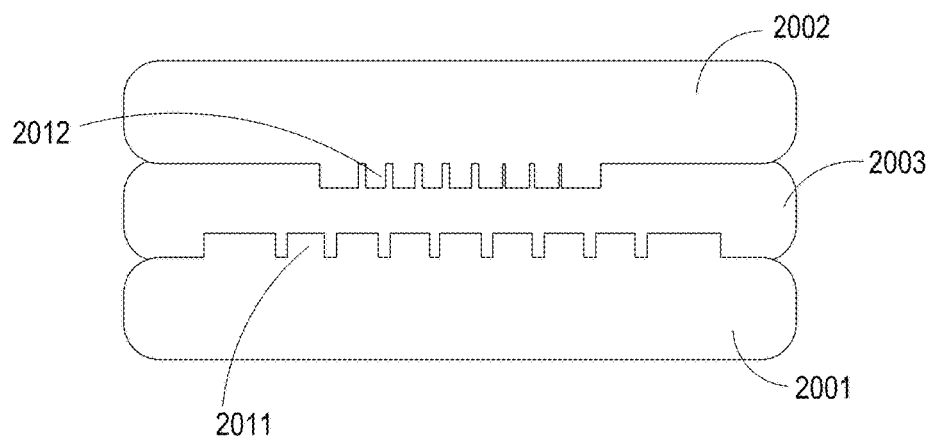

With reference to FIG. 17B, the molds 2001, 2002 can be brought together to compress the material 2003, thereby forming the waveguide layer. For example, the molds 2001, 2001 can contact the material 2003 such that at least one of the molds 2001, 2002 transfers the corresponding imprint into the material 2003.

Figure 17C:
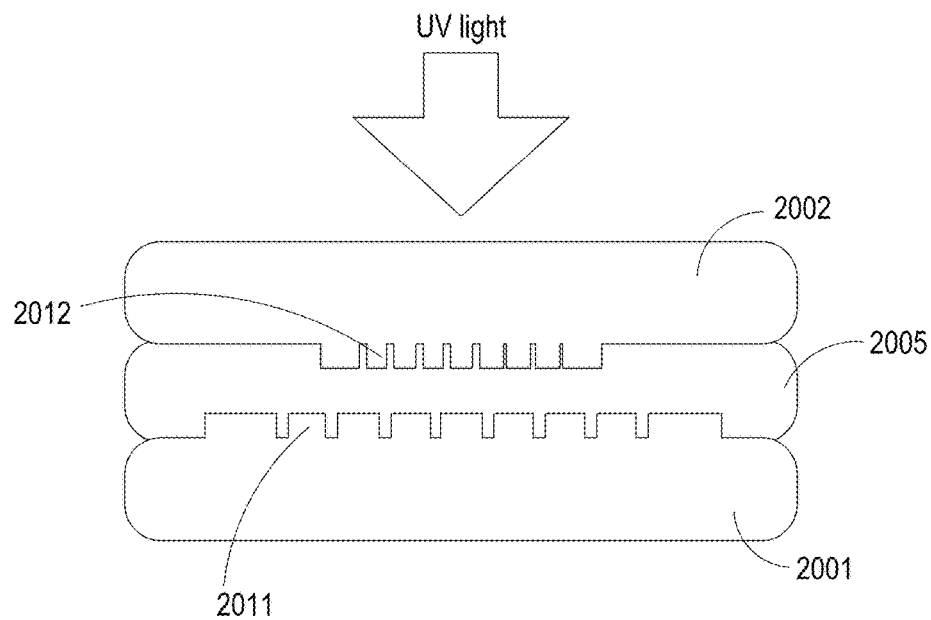

With reference to FIG. 17C, the compressed material 2003 may be subjected to a hardening process. As an example, the compressed material 2003 may be subjected to a curing process (e.g., exposure to ultraviolet light) to harden the material to form a substantially solid waveguide layer 2005. As illustrated, the negative imprint 2011, 2012 can define at least a part of the optical element in the waveguide layer 2005.

Figure 17D:
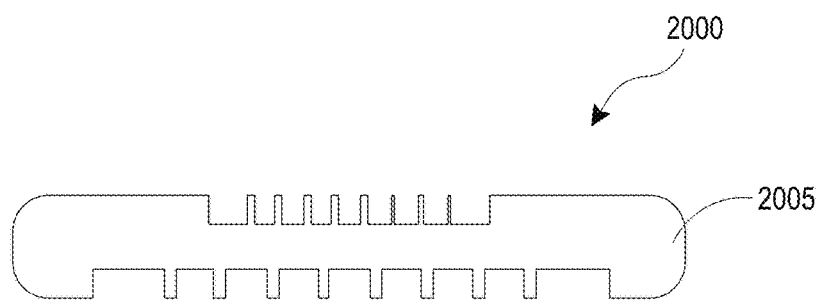

With reference to FIG. 17D, the molds 2001, 2002 can be moved apart relative to one another and the waveguide layer 2005 can be released from the molds 2001, 2002, thereby forming the waveguide 2000 such that a surface portion of the waveguide forms at least a part the optical element. In some implementations, additional steps can be performed to fabricate the remaining part of the optical element, e.g., depositing material on the formed part of the optical element. For example, a tilted surface portion (e.g., 1130 of FIG. 11) or a curved surface portion (e.g., 1230 of FIG. 12) may be metallized. As another example, a material can be deposited on a surface relief pattern (e.g., 1665 of FIG. 16).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A waveguide comprising:
    an optically transparent layer comprising optically transparent material and a plurality of surfaces that are arranged to guide light in the waveguide by total internal reflection, wherein the light includes image information; and
    an in-coupling optical element that is configured to deflect the light into the waveguide such that the light is guided in the optically transparent layer, wherein the in-coupling optical element includes:
        a prism, and
        a lens that is integrated with the prism and that comprises curvature to provide optical power to the light that is incident on the in-coupling element and deflected thereby into the waveguide.

2. The waveguide of claim 1, wherein the optical power is a positive optical power.

3. The waveguide of claim 1, wherein the lens has a concave curvature from the perspective of most locations within the optically transparent layer.

4. The waveguide of claim 1, wherein each of the plurality of surfaces has a surface roughness of about 0.1 nm to about 2.0 nm.

5. The waveguide of claim 1, wherein the optically transparent material comprises a polymer.

6. The waveguide of claim 1, wherein the optically transparent layer, the plurality of surfaces, and the in-coupling optical element form a molded optic.

7. The waveguide of claim 1, wherein the in-coupling optical element does not extend completely through the optically transparent layer.

8. A waveguide comprising:
    an optically transparent layer comprising optically transparent material and first and second surfaces that are arranged to guide light in the waveguide by total internal reflection, wherein the light includes image information;
    a lens formed in a surface portion of the first surface, wherein the lens is monolithically integrated with the waveguide; and
    an in-coupling optical element configured to receive the light that has passed through the lens and to turn at least a portion of the received light into the optically transparent layer to be guided therein, wherein the in-coupling optical element is aligned with the lens such that the lens imparts optical power to the light received by the in-coupling optical element.

9. The waveguide of claim 8, wherein the lens is a convex lens.

10. The waveguide of claim 8, wherein the lens is a positive powered lens.

11. The waveguide of claim 9, wherein the in-coupling optical element is disposed on the second surface of the optically transparent layer.

12. The waveguide of claim 8, wherein each of the plurality of surfaces has a surface roughness of about 0.1 nm to about 2.0 nm.

13. The waveguide of claim 8, wherein the optically transparent material comprises a polymer.

14. The waveguide of claim 8, wherein the optically transparent layer, the first and second surfaces, and the lens form a molded optic.

15. The waveguide of claim 8, wherein the in-coupling optical element is a grating.

16. The waveguide of claim 8, wherein the in-coupling optical element is integrated with the optically transparent layer.

* * * * *